US012387682B2

(12) United States Patent
Pyun et al.

(10) Patent No.: US 12,387,682 B2
(45) Date of Patent: Aug. 12, 2025

(54) DISPLAY DEVICE

(71) Applicant: Samsung Display Co., Ltd., Yongin-si (KR)

(72) Inventors: Kihyun Pyun, Gwangmyeong-si (KR); Hyunjoo Seo, Changwon-si (KR); Seung-Woon Shin, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/985,563

(22) Filed: Nov. 11, 2022

(65) Prior Publication Data

US 2023/0260459 A1 Aug. 17, 2023

(30) Foreign Application Priority Data

Feb. 14, 2022 (KR) ........................ 10-2022-0018926

(51) Int. Cl.

| | |
|---|---|
| ***G09G 3/32*** | (2016.01) |
| ***G09G 3/00*** | (2006.01) |
| ***G09G 3/20*** | (2006.01) |
| ***G09G 3/3258*** | (2016.01) |

(52) U.S. Cl.

CPC ........... *G09G 3/3258* (2013.01); *G09G 3/006* (2013.01); *G09G 3/2011* (2013.01); *G09G 3/32* (2013.01); *G09G 2310/08* (2013.01); *G09G 2330/025* (2013.01); *G09G 2330/045* (2013.01)

(58) Field of Classification Search

CPC .. G09G 1/00; G09G 3/00; G09G 5/00; G09G 2320/0252; G09G 2340/16; G09G 3/3648; G09G 2330/021; G09G 2320/0261

See application file for complete search history.

(56) References Cited

U.S. PATENT DOCUMENTS

| | | | | |
|---|---|---|---|---|
| 8,558,829 | B2 * | 10/2013 | Byun | G09G 3/3233 345/55 |
| 8,854,399 | B2 | 10/2014 | Arkhipov et al. | |
| 9,240,142 | B2 | 1/2016 | Oh et al. | |
| 10,049,618 | B2 | 8/2018 | Jeong | |

(Continued)

FOREIGN PATENT DOCUMENTS

| | | | |
|---|---|---|---|
| KR | 100590241 | B1 | 6/2006 |
| KR | 101442680 | B1 | 9/2014 |

(Continued)

*Primary Examiner* — Michael A Faragalla

(74) *Attorney, Agent, or Firm* — CANTOR COLBURN LLP

(57) ABSTRACT

A display device includes a display panel including a pixel which receives a driving voltage through a first voltage line, a voltage generator which provides the driving voltage which has a first voltage level to the first voltage line and determines a voltage level of the driving voltage based on a voltage control signal, a current sensor which senses a current level of the first voltage line and outputs a current signal corresponding to the sensed current level, and an overcurrent controller which outputs the voltage control signal which changes the voltage level of the driving voltage when a difference value between present and previous current levels of the current signal is a reference value or greater. The voltage level of the driving voltage changes to a second voltage level lower than the first voltage level when the difference value is the reference value or greater.

25 Claims, 20 Drawing Sheets

(56) References Cited

U.S. PATENT DOCUMENTS

| | | | | |
|---|---|---|---|---|
| 10,796,618 | B2 | 10/2020 | Nam et al. | |
| 2014/0104259 | A1* | 4/2014 | Oh | G09G 3/3266 345/212 |
| 2020/0184889 | A1* | 6/2020 | Jang | G09G 3/3233 |
| 2020/0228110 | A1* | 7/2020 | Akahane | H02M 1/32 |

FOREIGN PATENT DOCUMENTS

| | | | |
|---|---|---|---|
| KR | 1020160028591 | A | 3/2016 |
| KR | 1020160119909 | A | 10/2016 |
| KR | 1020170007574 | A | 1/2017 |
| KR | 101712086 | B1 | 3/2017 |
| KR | 1020170081059 | A | 7/2017 |
| KR | 1020190055873 | A | 5/2019 |
| KR | 102239898 | B1 | 4/2021 |

* cited by examiner

DISPLAY DEVICE

This application claims priority to Korean Patent Application No. 10-2022-0018926, filed on Feb. 14, 2022, and all the benefits accruing therefrom under 35 U.S.C. § 119, the content of which in its entirety is herein incorporated by reference.

BACKGROUND

1. Field

The disclosure herein relates to a display device.

2. Description of the Related Art

An electronic device such as a smartphone, a digital camera, a laptop computer, a navigation device, a monitor, and a smart television ("TV"), which provides an image to a user, includes a display device for displaying the image. The display device generates an image and provides the generated image to a user through a display screen.

The display device includes a plurality of pixels and driving circuits for controlling the plurality of pixels. Each of the plurality of pixels includes a light-emitting element and a pixel circuit for controlling the light-emitting element. The pixel circuit of the pixel may include a plurality of transistors organically connected to each other.

The display device may display a predetermined image by applying a data signal to a display panel and supplying a current corresponding to the data signal to the light-emitting element.

SUMMARY

An amount of a current supplied to a light-emitting element may vary depending on an ambient temperature and/or a temperature of a display panel.

The disclosure provides a display device capable of minimizing a change, according to an ambient environment, in a driving current supplied to a light-emitting element.

An embodiment of the inventive concept provides a display device including a display panel including a pixel receiving a driving voltage through a first voltage line, a voltage generator which provides the driving voltage having a first voltage level to the first voltage line and determines a voltage level of the driving voltage based on a voltage control signal, a current sensor which senses a current level of the first voltage line and outputs a current signal corresponding to the current level sensed by the current sensor, and an overcurrent controller which outputs the voltage control signal which changes the voltage level of the driving voltage when a difference value between a present current level and a previous current level of the current signal is greater than or equal to a reference value. The voltage level of the driving voltage is changed to a second voltage level lower than the first voltage level when the difference value is greater than or equal to the reference value.

In an embodiment, the overcurrent controller may output the voltage control signal which changes the voltage level of the driving voltage when the current level of the current signal is higher than or equal to a reference level.

In an embodiment, the overcurrent controller may include a first overcurrent detector which outputs a first overcurrent detection signal of an active level when the current level of the current signal is higher than or equal to a reference level, a second overcurrent detector which outputs a second overcurrent detection signal of the active level when the difference value between the current level and the previous current level of the current signal is greater than or equal to the reference value, and a controller which outputs the voltage control signal which changes the voltage level of the driving voltage when at least one of the first overcurrent detection signal and the second overcurrent detection signal is at the active level.

In an embodiment, the overcurrent controller may further include a first lookup table which stores the reference value corresponding to the current level of the current signal.

In an embodiment, the reference value may decrease when the current level of the current signal increases.

In an embodiment, the overcurrent controller may further include a memory which stores the current signal and outputs a previous current signal, and a comparator which calculates a difference value between the current level of the current signal and a previous current level of the previous current signal from the memory and outputs the difference value between the present current level of the current signal and the previous current level of the previous current signal.

In an embodiment, the overcurrent controller may further include a second lookup table which stores a first voltage signal which changes the voltage level of the driving voltage to the second voltage level when the first overcurrent detection signal is at the active level, and a third lookup table which stores an intermediate voltage signal which changes the voltage level of the driving voltage to an intermediate voltage level when the second overcurrent detection signal is at the active level.

In an embodiment, the controller may output the voltage control signal which changes the voltage level of the driving voltage in response to the first overcurrent detection signal, the second overcurrent detection signal, the first voltage signal, and the intermediate voltage signal.

In an embodiment, the controller may output the voltage control signal which changes the voltage level of the driving voltage to the second voltage level corresponding to the first voltage signal when the first overcurrent detection signal is at the active level, and the controller may output the voltage control signal which changes the voltage level of the driving voltage to the intermediate voltage level corresponding to the intermediate voltage signal when the second overcurrent detection signal is at the active level.

In an embodiment, the controller may output the voltage control signal for setting the driving voltage to the first voltage level higher than the second voltage level when both of the first overcurrent detection signal and the second overcurrent detection signal are at an inactive level, and the intermediate voltage level may be higher than the second voltage level and lower than the first voltage level.

In an embodiment, a difference between the intermediate voltage level and the second voltage level may be greater than a difference between the first voltage level and the intermediate voltage level.

In an embodiment, the display device may further include a temperature sensor which senses an ambient temperature and outputs a temperature signal corresponding to the ambient temperature sensed by the temperature sensor.

In an embodiment, the overcurrent controller may include an overcurrent detector which outputs an overcurrent detection signal of an active level when the current level of the current signal is higher than or equal to the reference level, a voltage level adjuster which outputs a first voltage signal and an intermediate voltage signal in response to the overcurrent detection signal and the temperature signal, and a controller which outputs the voltage control signal which changes the voltage level of the driving voltage in response to the overcurrent detection signal, the first voltage signal, and the intermediate voltage signal.

In an embodiment, the voltage level adjuster may include a panel temperature calculator which calculates a temperature of the display panel based on an image signal and the temperature signal and outputs a panel temperature signal.

In an embodiment, the voltage level adjuster may determine a voltage level of the first voltage signal based on the panel temperature signal when the overcurrent detection signal transitions from an inactive level to the active level, and the voltage level adjuster may determine a voltage level of the intermediate voltage signal based on the panel temperature signal when the overcurrent detection signal transitions from the active level to the inactive level.

In an embodiment, the pixel may include a light-emitting element, and a transistor which is connected between the first voltage line and the light-emitting element and includes a gate electrode controlled by a data signal.

In an embodiment of the inventive concept, a display device includes a display panel including a pixel receiving a driving voltage through a first voltage line, a voltage generator which provides the driving voltage having a first voltage level to the first voltage line and determines a voltage level of the driving voltage based on a voltage control signal, a current sensor which senses a current level of the first voltage line and outputs a current signal corresponding to the current level sensed by the current sensor, a temperature sensor which senses an ambient temperature and outputs a temperature signal corresponding to the ambient temperature sensed by the temperature sensor, and an overcurrent controller which outputs the voltage control signal based on the current signal and the temperature signal. The voltage level of the driving voltage is changed to a second voltage level lower than the first voltage level when the current signal has a current level higher than or equal to a reference level, and the voltage level of the driving voltage gradually rises from the second voltage level to the first voltage level during a restoration period in which the driving voltage is restored from the second voltage level to the first voltage level, and the second voltage level is determined based on the temperature signal.

In an embodiment, the overcurrent controller may include an overcurrent detector which compares the current signal with the reference level and outputs an overcurrent detection signal, a voltage level adjuster which outputs a first voltage signal corresponding to the second voltage level and an intermediate voltage signal corresponding to an intermediate voltage level based on the overcurrent detection signal and the temperature signal, and a controller which outputs the voltage control signal in response to the overcurrent detection signal, the first voltage signal, and the intermediate voltage signal.

In an embodiment, the voltage level adjuster may further include a panel temperature calculator which calculates a temperature of the display panel based on the temperature signal and an image signal and outputs a panel temperature signal corresponding to the temperature calculated by the panel temperature calculator.

In an embodiment, the voltage level adjuster may include a lookup table which stores a first voltage control signal corresponding to the panel temperature signal, and a first voltage adjustor which outputs the first voltage signal based on the panel temperature signal and the first voltage control signal of the lookup table when the overcurrent detection signal transitions from an inactive level to an active level.

In an embodiment, a voltage level of the first voltage control signal may be lowered as a temperature level of the panel temperature signal rises.

In an embodiment, the voltage level adjuster may further include a first lookup table which stores a first intermediate voltage control signal corresponding to the panel temperature signal, a second lookup table which stores a second intermediate voltage control signal corresponding to the panel temperature signal, and a second voltage adjustor which outputs the intermediate voltage signal based on the overcurrent detection signal, the temperature signal, the first intermediate voltage control signal, and the second intermediate voltage control signal.

In an embodiment, a voltage level of the first intermediate voltage control signal may be lowered as a temperature level of the panel temperature signal rises.

In an embodiment, the second lookup table may include a plurality of voltage control signals and may sequentially provide the plurality of voltage control signals as the second intermediate voltage control signal.

In an embodiment, after the overcurrent detection signal transitions from the active level to the inactive level, the voltage level of the driving voltage may correspond to a first intermediate voltage control signal in a first frame and may correspond to a second intermediate voltage control signal in a second frame.

In an embodiment, the display device may further include an image processor which receives the image signal and a grayscale control signal and converts the image signal into an image data signal in response to the grayscale control signal.

In an embodiment, the voltage level adjuster may further include a first lookup table which stores a first correction signal, a second lookup table which stores a second correction signal corresponding to the panel temperature signal, and a grayscale adjustor which outputs one of the first correction signal and the second correction signal as the grayscale control signal based on the panel temperature signal when the overcurrent detection signal transits from an inactive level to an active level.

In an embodiment, when the overcurrent detection signal is at the active level, the grayscale adjustor may output the first correction signal as the grayscale control signal when a temperature level of the panel temperature signal is lower than a first temperature, and may output the second correction signal as the grayscale control signal when the temperature level of the panel temperature signal is higher than or equal to the first temperature.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to describe principles of the inventive concept. In the drawings.

DETAILED DESCRIPTION

Figure 1:
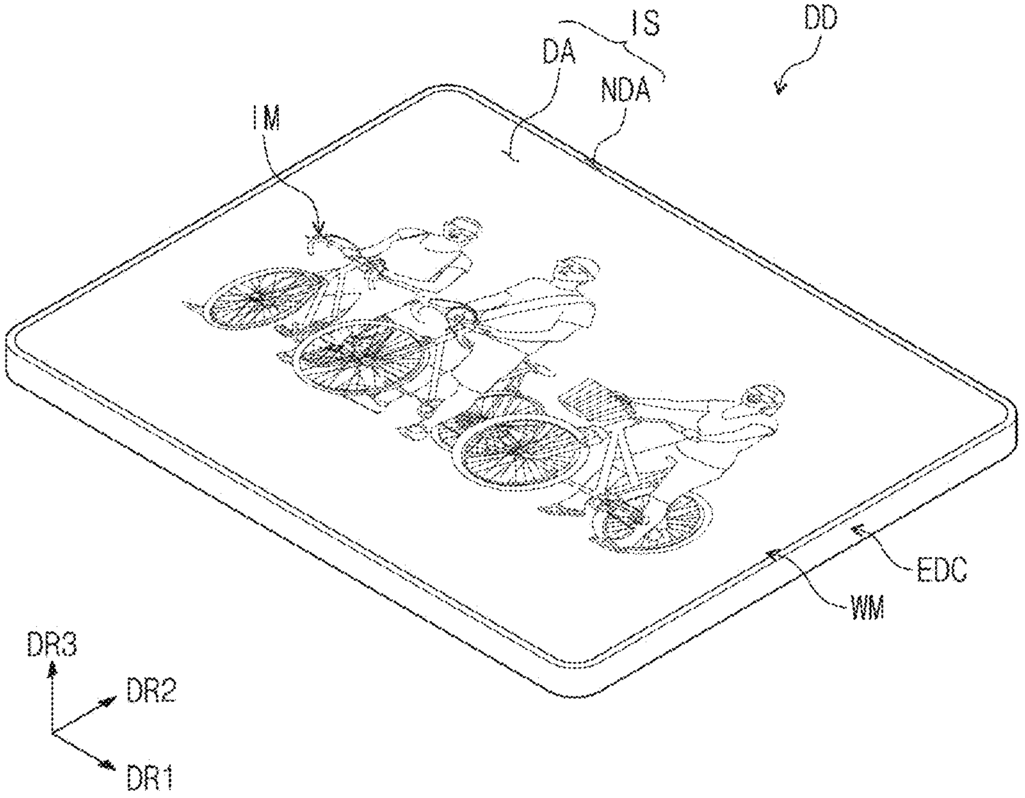
FIG. 1 is a perspective view of an embodiment of a display device according to the inventive concept.

It will be understood that when an element or layer is referred to as being "on", "connected to", or "coupled to" another element or layer, it can be directly on, connected to, or coupled to the other element or layer, or intervening elements or layers may be present.

Like reference numerals refer to like elements throughout this specification. In the drawing figures, the thicknesses, ratios, and dimensions of elements are exaggerated for effective description of the technical contents. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the invention. As used herein, the singular forms, "a", "an", and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures.

It will be further understood that the terms "include" or "have", when used in this specification, specify the presence of stated features, integers, steps, operations, elements, and/or components, but do not preclude the presence or addition of one or more other features, integers, steps, operations, elements, components, and/or groups thereof.

The term "module" or "unit" as used herein is intended to mean a software component or a hardware component that performs a predetermined function. The hardware component may include, e.g., a field-programmable gate array ("FPGA") or an application-specific integrated circuit ("ASIC"). The software component may refer to an executable code and/or data used by the executable code in an addressable storage medium. Thus, the software components may be, e.g., object-oriented software components, class components, and task components, and may include processes, functions, attributes, procedures, subroutines, segments of program code, drivers, firmware, micro codes, circuits, data, a database, data structures, tables, arrays, or variables.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having meaning that is consistent with their meaning in the context of the relevant art and should not be interpreted in an overly idealized or overly formal sense unless expressly so defined herein.

Hereinafter, the invention will be explained in detail with reference to the accompanying drawings.

Figure 2:
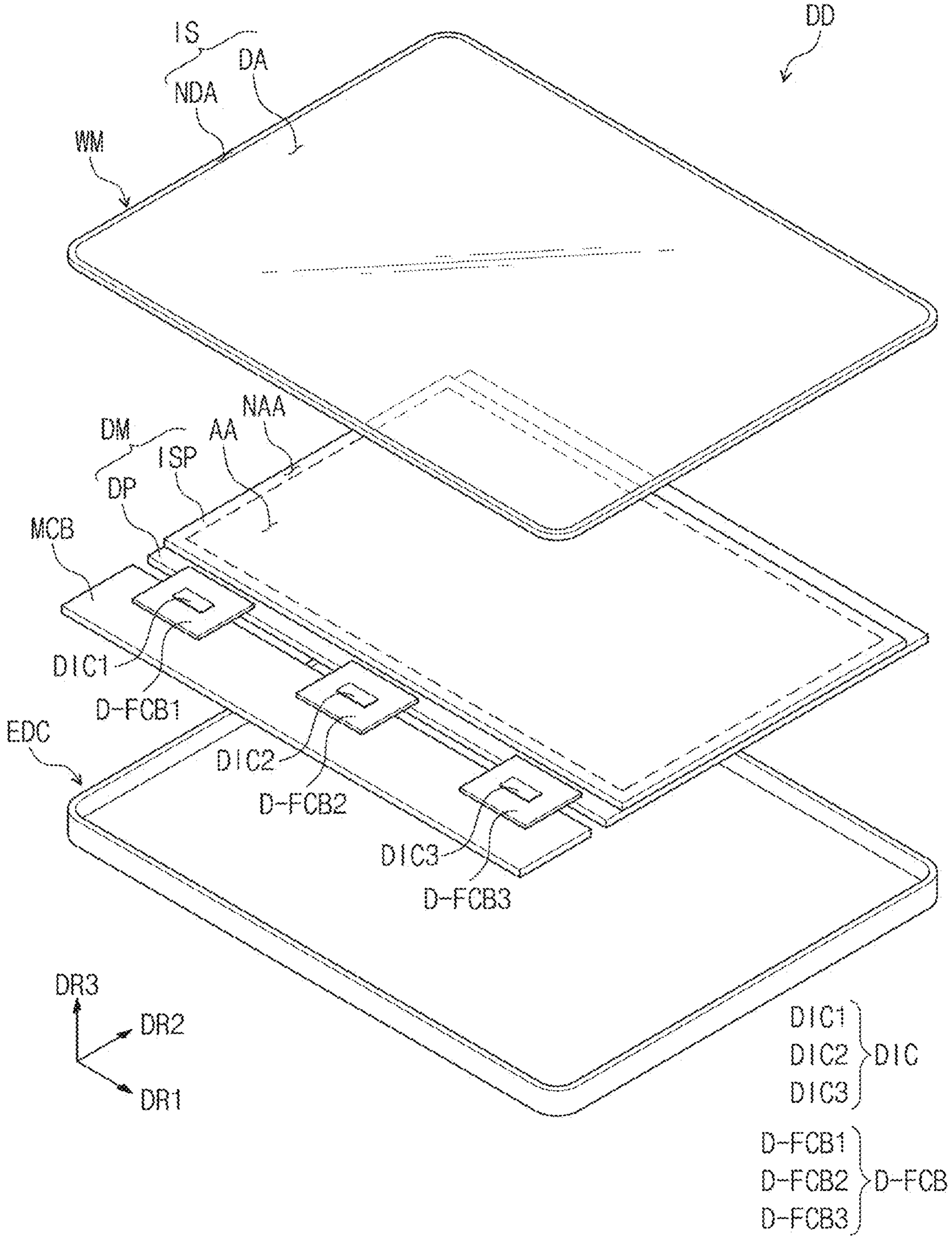
FIG. 2 is an exploded perspective view of an embodiment of a display device according to the inventive concept.

FIG. 1 is a perspective view of an embodiment of a display device according to the inventive concept, and FIG. 2 is an exploded perspective view of an embodiment of a display device according to the inventive concept.

Referring to FIGS. 1 and 2, a display device DD may be a device that is activated according to an electrical signal. The display device DD in an embodiment of the inventive concept may be a large-sized display device such as a television and a monitor, and may also be a medium- and small-sized display device such as a mobile phone, a tablet, a laptop computer, a car navigation device, and a game machine. These are merely some of embodiments, and the display device DD may include other types of display devices as long as the display devices do not depart from the inventive concept. The display device DD has a quadrangular (e.g., rectangular) shape having long sides in a first direction DR1 and short sides in a second direction DR2 crossing the first direction DR1. However, the shape of the display device DD is not limited thereto, and the display device DD may be provided in various shapes. The display device DD may display an image IM toward a third direction DR3 on a display surface IS parallel to each of the first direction DR1 and the second direction DR2. The display surface IS on which the image IM is displayed may correspond to a front surface of the display device DD.

In this embodiment, a front surface (or a top surface) and a rear surface (or a bottom surface) of each of members are defined in relation to the direction in which the image IM is displayed. The front surface and the rear surface may be opposing each other in the third direction DR3, and a normal direction of each of the front surface and the rear surface may be parallel to the third direction DR3.

A distance between the front surface and the rear surface in the third direction DR3 may correspond to a thickness of the display device DD in the third direction DR3. The directions indicated by the first to third directions DR1, DR2, and DR3 are relative and may be converted into different directions.

The display device DD may sense an external input applied from the outside. The external input may include various types of inputs provided from outside of the display device DD. The display device DD in an embodiment of the inventive concept may sense a user's external input applied from the outside. The user's external input may be any one or a combination of various types of external inputs such as a part of a user's body, light, heat, gaze, and pressure. In addition, the display device DD may sense, according to the structure thereof, the user's external input that is applied to a side surface or a rear surface of the display device DD, and is not limited to any particular embodiment. In an embodiment of the inventive concept, the external input may include an input by an input device (e.g., a stylus pen, an active pen, a touch pen, an electronic pen, an e-pen, etc.).

The display surface IS of the display device DD may be divided into a display area DA and a non-display area NDA. The display area DA may be an area in which the image IM is displayed. A user views the image IM through the display area DA. In this embodiment, the display area DA is illustrated as a quadrangular (e.g., rectangular) shape having round vertices. However, this is illustrative, and the display area DA may have various shapes and is not limited to any particular embodiment.

The non-display area NDA is adjacent to the display area DA. The non-display area NDA may have a predetermined color. The non-display area NDA may surround the display area DA. Accordingly, the shape of the display area DA may be substantially defined by the non-display area NDA. However, this is illustrative, and the non-display area NDA may be disposed adjacent to only one side of the display area DA or may be omitted. The display device DD in an embodiment of the inventive concept may include various embodiments and is not limited to any particular embodiment.

As illustrated in FIG. 2, the display device DD may include a display module DM and a window WM disposed on the display module DM. The display module DM may include a display panel DP and an input sensing layer ISP.

The display panel DP in an embodiment of the inventive concept may be a light-emitting display panel. In an embodiment, the display panel DP may be an organic light-emitting display panel, an inorganic light-emitting display panel, or a quantum dot light-emitting display panel, for example. A light-emitting layer of the organic light-emitting display panel may include an organic light-emitting material. A light-emitting layer of the inorganic light-emitting display panel may include an inorganic light-emitting material. A light-emitting layer of the quantum dot light-emitting display panel may include quantum dots, quantum rods, or the like.

Hereinafter, the display panel DP in this embodiment will be described as an organic light-emitting display panel.

The display panel DP may output the image IM, and the outputted image IM may be displayed through the display surface IS.

The input sensing layer ISP may be disposed on the display panel DP to sense an external input. The input sensing layer ISP may be directly disposed on the display panel DP. In an embodiment of the inventive concept, the input sensing layer ISP may be formed on the display panel DP by a continuous process. That is, when the input sensing layer ISP is directly disposed on the display panel DP, an internal adhesive film (not illustrated) is not disposed between the input sensing layer ISP and the display panel DP. However, the internal adhesive film may be disposed between the input sensing layer ISP and the display panel DP. In this case, the input sensing layer ISP may not be manufactured by a continuous process together with the display panel DP, but may be manufactured through a process separated from that of the display panel DP, and then may be fixed to a top surface of the display panel DP by the internal adhesive film.

The window WM may include a transparent material capable of emitting the image IM. In an embodiment, the window WM may include glass, sapphire, plastic, or the like, for example. Although illustrated as a single layer, the window WM is not limited thereto and may include a plurality of layers.

Although not illustrated, the above-described non-display area NDA of the display device DD may be substantially provided as an area of the window WM in which a predetermined color is printed with a material having the color. In an embodiment of the inventive concept, the window WM may include a light-blocking pattern for defining the non-display area NDA. The light-blocking pattern may be a colored organic film and may be formed, for example, in a coating method, for example.

The window WM may be bonded to the display module DM through an adhesive film. In an embodiment of the inventive concept, the adhesive film may include an optically clear adhesive ("OCA") film. However, the adhesive film is not limited thereto and may include a typical adhesive or detachable adhesive. In an embodiment, the adhesive film may include an optically clear resin ("OCR") or a pressure sensitive adhesive ("PSA") film, for example.

An anti-reflection layer may be further disposed between the window WM and the display module DM. The anti-reflection layer reduces the degree of reflection of external light incident from above the window WM. The anti-reflection layer in an embodiment of the inventive concept may include a retarder and a polarizer. The retarder may be of a film type or a liquid crystal coating type. The polarizer may also be of the film type or the liquid crystal coating type. The film type may include a stretched synthetic resin film, and the liquid crystal coating type may include liquid crystals aligned in a predetermined alignment. The retarder and the polarizer may be implemented as one polarizing film.

In an embodiment of the inventive concept, the anti-reflection layer may include color filters. An arrangement of the color filters may be determined in consideration of colors of light generated by a plurality of pixels PX (refer to FIG. 3) included in the display panel DP. The anti-reflection layer may further include a light-blocking pattern.

The display module DM may display the image IM according to an electrical signal and may transmit/receive information about an external input. The display module DM may be defined as an effective area AA and a non-effective area NAA. The effective area AA may be defined as an area in which the image IM provided by the display module DM is emitted. In addition, the effective area AA may also be defined as an area in which the input sensing layer ISP senses the external input applied from the outside.

The non-effective area NAA is adjacent to the effective area AA. In an embodiment, the non-effective area NAA may surround the effective area AA, for example. However, this is illustrative, and the non-effective area NAA may be defined in various shapes and is not limited to any particular embodiment. In an embodiment, the effective area AA of the display module DM may correspond to at least a portion of the display area DA.

The display module DM may further include a main circuit board MCB, flexible circuit films D-FCB, and driving chips DIC. The main circuit board MCB may be electrically connected to the display panel DP by being connected to the flexible circuit films D-FCB. The flexible circuit films D-FCB are connected to the display panel DP to electrically connect the display panel DP and the main circuit board MCB. The main circuit board MCB may include a plurality of driving elements. The plurality of driving elements may include a circuit unit for driving the display panel DP. The driving chips DIC may be disposed (e.g., mounted) on the flexible circuit films D-FCB.

In an embodiment of the inventive concept, the flexible circuit films D-FCB may include a first flexible circuit film D-FCB1, a second flexible circuit film D-FCB2, and a third flexible circuit film D-FCB3. The driving chips DIC may include a first driving chip DIC1, a second driving chip DIC2, and a third driving chip DIC3. The first to third flexible circuit films D-FCB1, D-FCB2, and D-FCB3 may be disposed to be spaced apart from each other in the first direction DR1 and may be connected to the display panel DP to electrically connect the display panel DP and the main circuit board MCB. The first driving chip DIC1 may be disposed (e.g., mounted) on the first flexible circuit film D-FCB1. The second driving chip DIC2 may be disposed (e.g., mounted) on the second flexible circuit film D-FCB2. The third driving chip DIC3 may be disposed (e.g., mounted) on the third flexible circuit film D-FCB3. However, the inventive concept is not limited thereto. In an embodiment, the display panel DP may be electrically connected to the main circuit board MCB through one flexible circuit film, and only one driving chip may be disposed (e.g., mounted) on the one flexible circuit film, for example. In addition, the display panel DP may be electrically connected to the main circuit board MCB through four or more flexible circuit films, and driving chips may be respectively disposed (e.g., mounted) on the flexible circuit films.

FIG. 2 illustrates a structure in which the first to third driving chips DIC1, DIC2, and DIC3 are respectively disposed (e.g., mounted) on the first to third flexible circuit films D-FCB1, D-FCB2, and D-FCB3, but the inventive concept is not limited thereto. In an embodiment, the first to third driving chips DIC1, DIC2, and DIC3 may be directly disposed (e.g., mounted) on the display panel DP, for example. In this case, a portion of the display panel DP on which the first to third driving chips DIC1, DIC2, and DIC3 are disposed (e.g., mounted) may be bent and disposed on a rear surface of the display module DM. In addition, the first to third driving chips DIC1, DIC2, and DIC3 may also be directly disposed (e.g., mounted) on the main circuit board MCB.

The input sensing layer ISP may be electrically connected to the main circuit board MCB through the flexible circuit films D-FCB. However, the inventive concept is not limited thereto. That is, the display module DM may additionally include a separate flexible circuit film for electrically connecting the input sensing layer ISP to the main circuit board MCB.

The display device DD further includes an outer case EDC for accommodating the display module DM. The outer case EDC may combine with the window WM to define the appearance of the display device DD. The outer case EDC absorbs a shock applied from the outside and prevents foreign matter/moisture or the like from penetrating into the display module DM, thereby protecting the components accommodated in the outer case EDC. In an embodiment of the inventive concept, the outer case EDC may be provided in a form in which a plurality of storage members is combined.

The display device DD in an embodiment may further include an electronic module including various functional modules for operating the display module DM, a power supply module (e.g., a battery) for supplying power desired for the overall operation of the display device DD, a bracket for combining with the display module DM and/or the outer case EDC to divide the internal space of the display device DD, or the like.

Figure 3:
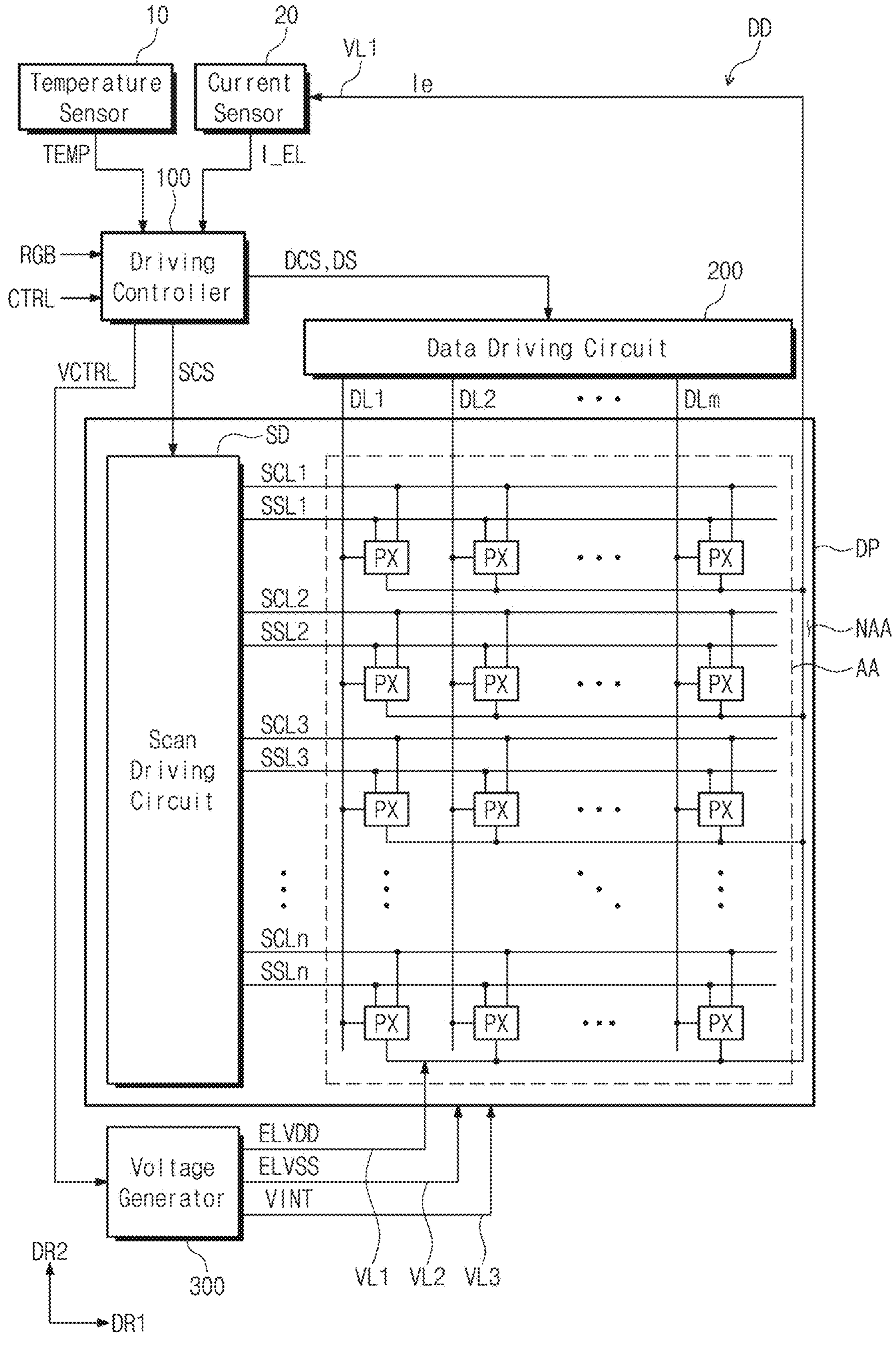
FIG. 3 is a block diagram of an embodiment of a display device according to the inventive concept.

FIG. 3 is a block diagram of an embodiment of a display device according to the inventive concept.

Referring to FIG. 3, the display device DD includes a temperature sensor 10, a current sensor 20, a driving controller 100, a data driving circuit 200, a voltage generator 300, and the display panel DP.

The driving controller 100 receives an image signal RGB and a control signal CTRL. The driving controller 100 generates an image data signal DS obtained by converting the data format of the image signal RGB according to an interface specification between the driving controller 100 and the data driving circuit 200. The driving controller 100 outputs a scan control signal SCS and a data control signal DCS. In this embodiment, the driving controller 100 may output a voltage control signal VCTRL for controlling the voltage generator 300.

The data driving circuit 200 receives the data control signal DCS and the image data signal DS from the driving controller 100. The data driving circuit 200 converts the image data signal DS into data signals and outputs the data signals to a plurality of data lines DL1 to DLm (m is a natural number) to be described later. The data signals are analog voltages corresponding to grayscale values of the image data signal DS. The data driving circuit 200 may be disposed in the driving chips DIC illustrated in FIG. 2.

The display panel DP includes first scan lines SCL1 to SCLn (n is a natural number), second scan lines SSL1 to SSLn, the data lines DL1 to DLm, and the pixels PX. The display panel DP may further include a scan driving circuit SD. In an embodiment, the scan driving circuit SD is disposed on a first side (e.g., a left side in FIG. 3) of the display panel DP. However, the invention is not limited thereto, and the scan driving circuit SD may be disposed on a different side of the display panel DP. The first scan lines SCL1 to SCLn and the second scan lines SSL1 to SSLn extend from the scan driving circuit SD in the first direction DR1.

The driving controller 100, the data driving circuit 200, and the scan driving circuit SD may be driving circuits that provide the data signals to the pixels PX of the display panel DP.

The display panel DP may be divided into an effective area AA and a non-effective area NAA. The pixels PX may be disposed in the effective area AA, and the scan driving circuit SD may be disposed in the non-effective area NAA.

The first scan lines SCL1 to SCLn and the second scan lines SSL1 to SSLn are arranged to be spaced apart from each other in the second direction DR2. The data lines DL1 to DLm extend from the data driving circuit 200 in a direction (e.g., a lower direction in FIG. 3) opposite to the second direction DR2 and are arranged to be spaced apart from each other in the first direction DR1.

Each of the plurality of pixels PX is electrically connected to a corresponding one of the first scan lines SCL1 to SCLn, a corresponding one of the second scan lines SSL1 to SSLn, and a corresponding one of the data lines DL1 to DLm. In an embodiment, pixels in a first row may be connected to scan lines SCL1 and SSL1, for example. In addition, pixels in a second row may be connected to scan lines SCL2 and SSL2.

Each of the plurality of pixels PX includes a light-emitting element ED (refer to FIG. 4) and a pixel circuit PXC (refer to FIG. 4) for controlling light emission of the light-emitting element. The pixel circuit PXC may include a plurality of transistors and a capacitor. The scan driving circuit SD may include transistors formed through the same process as the pixel circuit PXC. In an embodiment, the light-emitting element ED may be an organic light-emitting diode. However, the inventive concept is not limited thereto.

Each of the plurality of pixels PX may receive a first driving voltage ELVDD, a second driving voltage ELVSS, and an initialization voltage VINT.

The scan driving circuit SD receives the scan control signal SCS from the driving controller 100. In response to the scan control signal SCS, the scan driving circuit SD may output first scan signals to the first scan lines SCL1 to SCLn and may output second scan signals to the second scan lines SSL1 to SSLn. The circuit configuration and operation of the scan driving circuit SD will be described in detail later.

Although, in an embodiment, the scan driving circuit SD is disposed on the first side of the display panel DP, the inventive concept is not limited thereto. In another embodiment, scan driving circuits SD may be respectively disposed on a first side and a second side of a display panel DP. In an embodiment, the second side may be opposite to the first side, but the invention is not limited thereto. In an embodiment, one of the scan driving circuits disposed on the first side of the display panel DP may provide first scan signals to first scan lines SCL1 to SCLn, and the other of the scan driving circuits disposed on the second side of the display panel DP may provide second scan signals to second scan lines SSL1 to SSLn, for example.

The voltage generator 300 generates voltages desired for the operation of the display panel DP. In this embodiment, the voltage generator 300 generates the first driving voltage ELVDD, the second driving voltage ELVSS, and the initialization voltage VINT desired for the operation of the display panel DP. The first driving voltage ELVDD, the second driving voltage ELVSS, and the initialization voltage VINT may be provided to the display panel DP through a first voltage line VL1, a second voltage line VL2, and a third voltage line VL3, respectively.

The voltage generator 300 may further generate various voltages desired for the operations of the display panel DP and the scan driving circuit SD, in addition to the first driving voltage ELVDD, the second driving voltage ELVSS, and the initialization voltage VINT.

In an embodiment, the temperature sensor 10 senses an ambient temperature and provides a temperature signal TEMP to the driving controller 100.

The current sensor 20 senses a current Ie received from the first voltage line VL1 and provides the driving controller 100 with a current signal I_EL corresponding to a level of the current Ie sensed by the current sensor 20.

In an embodiment, the driving controller 100 may output the voltage control signal VCTRL for controlling the voltage generator 300 based on the temperature signal TEMP and/or the current signal I_EL.

In an embodiment, the driving controller 100 may output a grayscale control signal GCTRL (refer to FIG. 6) for adjusting a gray scale level of the image data signal DS based on the temperature signal TEMP and/or the current signal I_EL.

In an embodiment, the temperature sensor 10, the current sensor 20, and the driving controller 100 illustrated in FIG. 3 may be disposed (e.g., mounted) on the main circuit board MCB illustrated in FIG. 2.

In an embodiment, the temperature sensor 10 and the current sensor 20 may be disposed (e.g., mounted) on the main circuit board MCB, and the driving controller 100 may be disposed in the driving chips DIC illustrated in FIG. 2 together with the data driving circuit 200.

The configuration and operation of the driving controller 100, which outputs the voltage control signal VCTRL and/or the grayscale control signal GCTRL based on the temperature signal TEMP and/or the current signal I_EL, will be described in detail later.

Figure 4:
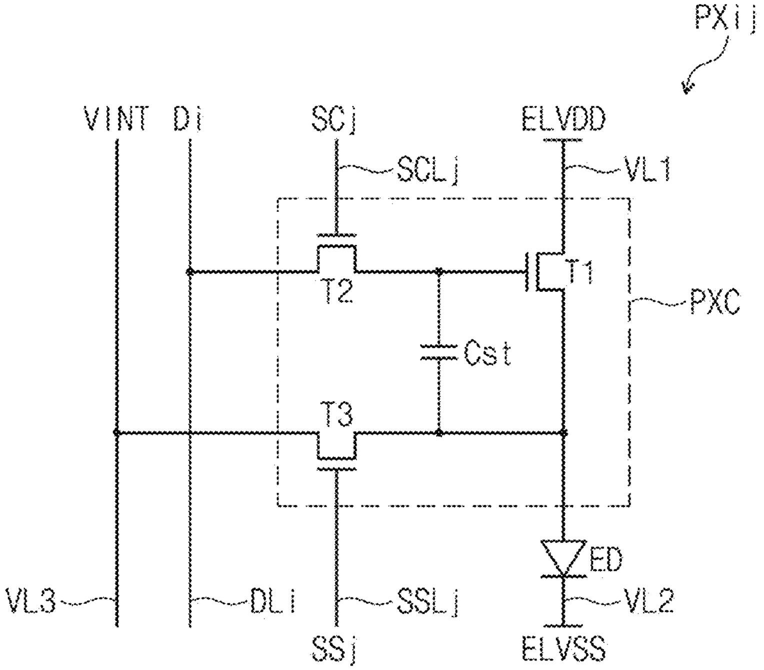
FIG. 4 is an equivalent circuit diagram of an embodiment of a pixel according to the inventive concept.

FIG. 4 is an equivalent circuit diagram of an embodiment of a pixel according to the inventive concept.

FIG. 4 illustrates an equivalent circuit diagram of a pixel PXij (i is a natural number equal to or less than m, and j is a natural number equal to or less than n) connected to an i-th data line DLi among the data lines DL1 to DLm, a j-th first scan line SCLj among the first scan lines SCL1 to SCLn, and a j-th second scan line SSLj among the second scan lines SSL1 to SSLn illustrated in FIG. 3.

Each of the plurality of pixels PX illustrated in FIG. 3 may have a circuit configuration the same as that of the equivalent circuit diagram of the pixel PXij illustrated in FIG. 4. In this embodiment, the pixel PXij includes at least one light-emitting element ED and the pixel circuit PXC.

The pixel circuit PXC may be electrically connected to the light-emitting element ED and may include at least one transistor for providing the light-emitting element ED with a current corresponding to a data signal Di transmitted from the data line DLi. In this embodiment, the pixel circuit PXC of the pixel PXij includes a first transistor T1, a second transistor T2, a third transistor T3, and a capacitor Cst. Each of the first to third transistors T1 to T3 is an N-type transistor employing an oxide semiconductor as a semiconductor layer. However, the inventive concept is not limited thereto, and each of the first to third transistors T1 to T3 may be a P-type transistor having a low-temperature polycrystalline silicon ("LTPS") semiconductor layer. In an embodiment, at least one of the first to third transistors T1 to T3 may be of the N-type transistor, and the remaining transistors may be of the P-type transistor. In addition, the circuit configuration of the pixel in an embodiment of the inventive concept is not limited to the circuit configuration in FIG. 4. The pixel circuit PXC illustrated in FIG. 4 is only one of embodiments, and the configuration of the pixel circuit PXC may be modified.

Referring to FIG. 4, the first scan line SCLj may transmit a first scan signal SCj, and the second scan line SSLj may transmit a second scan signal SSj. The data line DLi transmits the data signal Di. The data signal Di may have a voltage level corresponding to the image signal RGB inputted to the display device DD (refer to FIG. 1).

The first voltage line VL1 and the third voltage line VL3 may respectively transmit the first driving voltage ELVDD and the initialization voltage VINT to the pixel circuit PXC, and the second voltage line VL2 may transmit the second driving voltage ELVSS to a cathode (or a second terminal) of the light-emitting element ED.

The first transistor T1 includes a first electrode connected to the first voltage line VL1, a second electrode electrically connected to an anode (or a first terminal) of the light-emitting element ED, and a gate electrode connected to one end (e.g., upper end in FIG. 4) of the capacitor Cst. The first transistor T1 may supply a driving current to the light-emitting element ED in response to the data signal Di transmitted through the data line DLi according to a switching operation of the second transistor T2.

The second transistor T2 includes a first electrode connected to the data line DLi, a second electrode connected to the gate electrode of the first transistor T1, and a gate electrode connected to the first scan line SCLj. The second transistor T2 may be turned on according to the first scan signal SCj transmitted through the first scan line SCLj to transmit, to the gate electrode of the first transistor T1, the data signal Di transmitted from the data line DLi.

The third transistor T3 includes a first electrode connected to the third voltage line VL3, a second electrode connected to the anode of the light-emitting element ED, and a gate electrode connected to the second scan line SSLj. The third transistor T3 may be turned on according to the second scan signal SSj received through the second scan line SSLj to transmit the initialization voltage VINT to the anode of the light-emitting element ED.

The one end of the capacitor Cst is connected to the gate electrode of the first transistor T1 as described above, and the other end thereof is connected to the second electrode of the first transistor T1. The structure of the pixel PXij is not limited to an embodiment of the structure illustrated in FIG. 4. It is possible to variously modify the number of transistors included in the pixel PXij, the number of capacitors included in the pixel PXij, and a connection relationship thereof.

Figure 5:
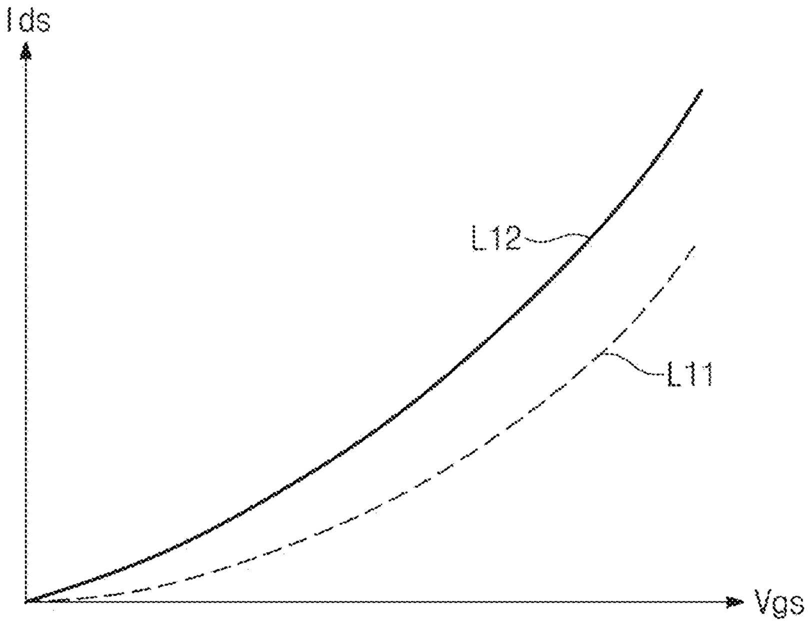
FIG. 5 is a graph showing a current-voltage characteristic of the first transistor illustrated in FIG. 4.

FIG. 5 is a graph showing a current-voltage characteristic of the first transistor illustrated in FIG. 4.

Referring to FIGS. 4 and 5, for the first transistor T1, a current Ids flowing from the first electrode to the second electrode may change depending on a voltage Vgs between the gate electrode and the second electrode.

A current-voltage characteristic of the first transistor T1 may change depending on an ambient temperature (or a temperature of the display panel DP (refer to FIG. 3)).

In FIG. 5, a first curve L11 is the current-voltage characteristic of the first transistor when the ambient temperature is a first temperature, and a second curve L12 is the current-voltage characteristic of the first transistor when the ambient temperature is a second temperature higher than the first temperature.

As may be seen from FIG. 5, as the ambient temperature rises, the current Ids flowing from the first electrode to the second electrode of the first transistor T1 increases. That is, the amount of a current flowing through the first voltage line VL1 may increase in a high-temperature environment.

Figure 6:
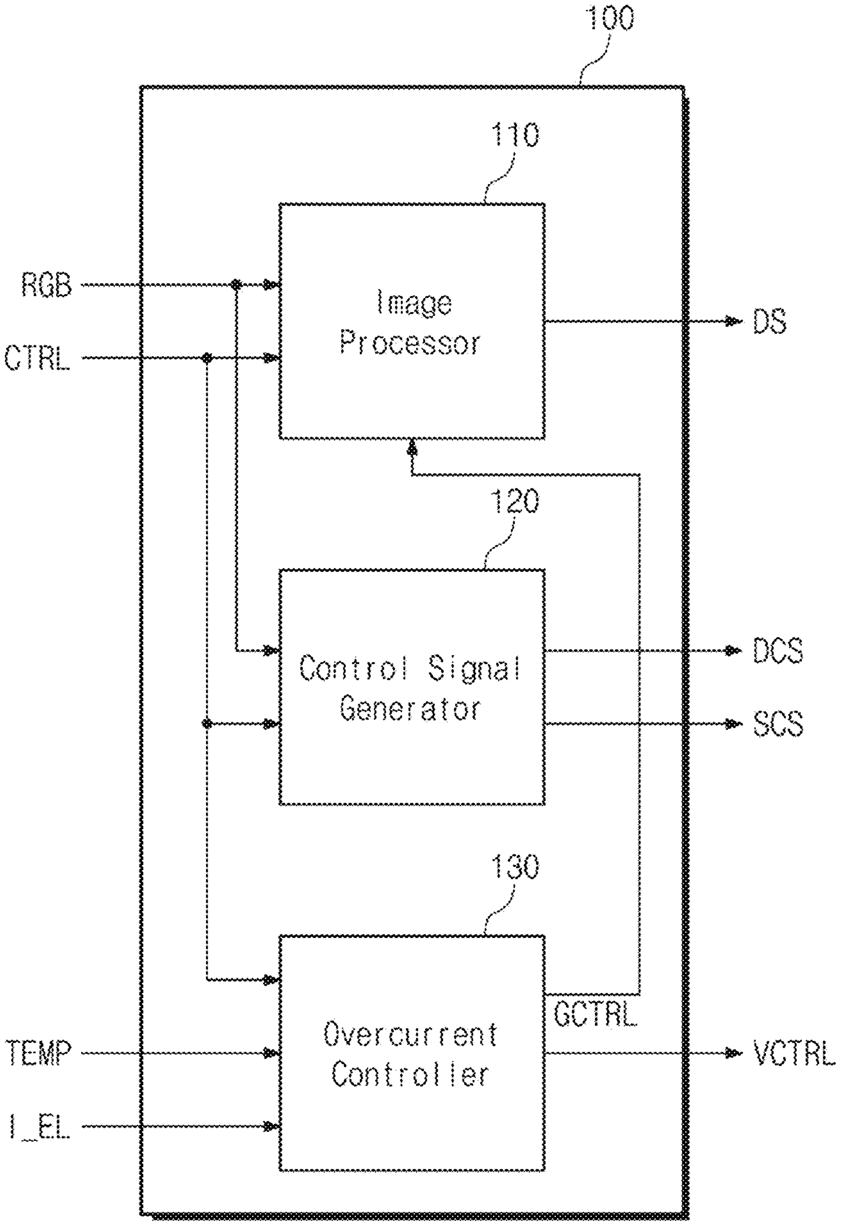
FIG. 6 is a block diagram of an embodiment of a driving controller according to the inventive concept.

FIG. 6 is a block diagram of an embodiment of a driving controller according to the inventive concept.

Referring to FIGS. 3 and 6, the driving controller 100 includes an image processor 110, a control signal generator 120, and an overcurrent controller 130.

The image processor 110 outputs the image data signal DS in response to the image signal RGB and the control signal CTRL. In an embodiment, the image processor 110 may change the grayscale level of the image data signal DS in response to the grayscale control signal GCTRL from the overcurrent controller 130.

The control signal generator 120 outputs the data control signal DCS and the scan control signal SCS in response to the image signal RGB and the control signal CTRL.

The overcurrent controller 130 outputs the grayscale control signal GCTRL and the voltage control signal VCTRL in response to the control signal CTRL, the temperature signal TEMP, and the current signal I_EL. The overcurrent controller 130 outputs the voltage control signal VCTRL for changing the voltage level of the first driving voltage ELVDD when a difference value between a present current level and a previous current level of the current signal I_EL is greater than or equal to a reference value. In an embodiment, in addition, the overcurrent controller 130 may output the voltage control signal VCTRL for changing the voltage level of the first driving voltage ELVDD when a present current level of the current signal I_EL is higher than or equal to a reference level.

The grayscale control signal GCTRL may be provided to the image processor 110, and the voltage control signal VCTRL may be provided to the voltage generator 300 illustrated in FIG. 3. The voltage generator 300 may change the voltage level of the first driving voltage ELVDD in response to the voltage control signal VCTRL.

Figure 7:
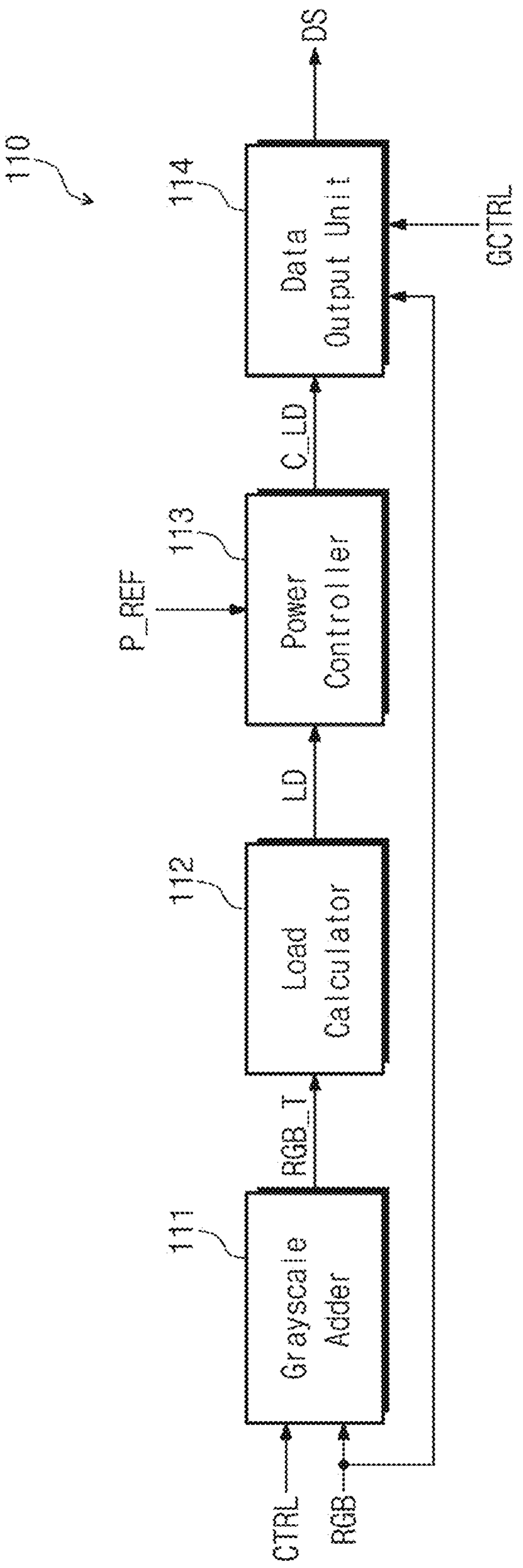
FIG. 7 is a block diagram illustrating an image processor.

FIG. 7 is a block diagram illustrating an image processor.

Referring to FIG. 7, the image processor 110 includes a grayscale adder 111, a load calculator 112, a power controller 113, and a data output unit 114.

The grayscale adder 111 sums a portion of the image signal RGB corresponding to one frame and outputs a sum signal RGB_T. The grayscale adder 111 may receive a portion of the image signal RGB corresponding to one frame in synchronization with a vertical synchronization signal included in the control signal CTRL.

The load calculator 112 may calculate a load of the one frame based on the sum signal RGB_T. The load calculator 112 outputs a load signal LD corresponding to the calculated load.

The power controller 113 adjusts a load level of the load signal LD according to a power consumption reference value P_REF and outputs an adjusted load signal C_LD.

The data output unit 114 may output the image data signal DS obtained by adjusting a grayscale level of the image signal RGB based on the adjusted load signal C_LD.

In an embodiment, the data output unit 114 may output the image data signal DS obtained by adjusting the grayscale level of the image signal RGB based on the grayscale control signal GCTRL provided from the overcurrent controller 130 (refer to FIG. 6) as well as the adjusted load signal C_LD.

In an embodiment, when the image signal RGB corresponds to a black image in a (k−1)-th frame (k is a natural number) and corresponds to a white image in a k-th frame, the image processor 110 may output, in the k-th frame, a corresponding portion of the image data signal DS having a grayscale level lower than a grayscale level of a corresponding portion of the image signal RGB to reduce power consumption, for example.

However, because time corresponding to one frame is desired for the operations of the grayscale adder 111, the load calculator 112, and the power controller 113 of the image processor 110, the portion of the image signal RGB corresponding to the white image of the k-th frame may be outputted, as it is, as a corresponding portion of the image data signal DS, and in a (k+1)-th frame eventually, the portion of the image data signal DS having the grayscale level lower than the grayscale level of the portion of the image signal RGB may be outputted.

As described with reference to FIGS. 4 and 5, for the first transistor T1, the current Ids flowing from the first electrode to the second electrode may change depending on the voltage Vgs between the gate electrode and the second electrode. When the voltage level of the data signal Di provided to the pixel PXij increases, the amount of the current flowing through the first voltage line VL1 increases.

In particular, when the temperature of the display panel DP gets higher, the current flowing through the first voltage line VL1 may sharply increase. When the current flowing through the first voltage line VL1 increases, the light emission luminance of the light-emitting element ED may increase abnormally.

The current sensor 20 illustrated in FIG. 3 senses the current Ie flowing through the first voltage line VL1 and provides the driving controller 100 with the current signal I_EL corresponding to the level of the sensed current.

Figure 8:
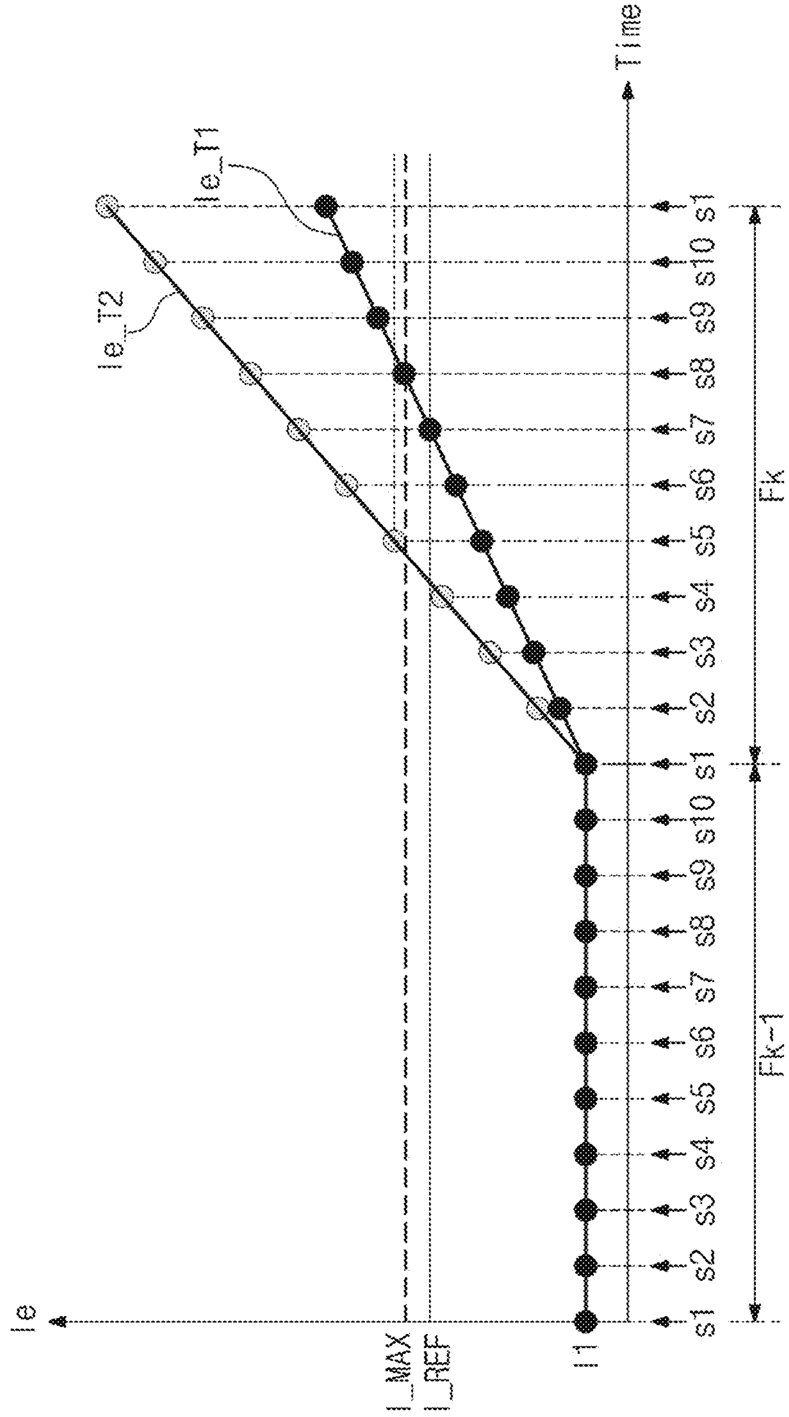
FIG. 8 is a graph for describing a current sensing operation of the current sensor illustrated in FIG. 3.

FIG. 8 is a graph for describing a current sensing operation of the current sensor illustrated in FIG. 3.

Referring to FIGS. 3 and 8, the current sensor 20 senses the current Ie of the first voltage line VL1 several times during one frame. In an embodiment, the current sensor 20 may sense the current Ie of the first voltage line VL1 at each of ten sensing time points s1 to s10 during one frame, for example. The number of times the current sensor 20 senses the current Ie during one frame may be determined according to current sensing characteristics of circuit blocks (e.g., an analog-to-digital converter) inside the current sensor 20.

A first current curve Ie_T1 represents a change in the current Ie when the temperature of the display panel DP is the first temperature, and a second current curve Ie_T2 represents a change in the current Ie when the temperature of the display panel DP is the second temperature higher than the first temperature.

The first current curve Ie_T1 and the second current curve Ie_T2 may be at a first current level I1 at each of the sensing time points s1 to s10 while a portion of the image data signal DS corresponding to a black grayscale is provided in a (k−1)-th frame Fk−1.

The first current curve Ie_T1 and the second current curve Ie_T2 rise to a level higher than the first current level I1 at each of the sensing time points s1 to s10 when a portion of the image data signal DS corresponding to a white grayscale is provided in a k-th frame Fk.

In the k-th frame Fk, a slope of the second current curve Ie_T2 is greater than a slope of the first current curve Ie_T1.

In an embodiment, when the temperature of the display panel DP is the first temperature, the level of the current Ie is lower than an overcurrent reference level I_REF at the sensing time point s6 and is equal to the overcurrent reference level I_REF at the sensing time point s7, for example.

The overcurrent controller 130 illustrated in FIG. 6 may output the voltage control signal VCTRL including information for changing the voltage level of the first driving voltage ELVDD when the level of the current Ie is higher than or equal to the overcurrent reference level I_REF at the sensing time point s7. When the voltage level of the first driving voltage ELVDD is lowered, the current Ie may decrease.

When the temperature of the display panel DP is the second temperature, the level of the current Ie is lower than the overcurrent reference level I_REF at the sensing time point s4 and is higher than the overcurrent reference level I_REF at the sensing time point s5.

When the current Ie at the sensing time point s5 exceeds a maximum current I_MAX of the display device DD, the display device DD may be damaged. Here, the maximum current I_MAX may be a maximum consumable current of the display device DD. The maximum current I_MAX may be different for each display device DD and may be a preset value.

In addition, as the temperature of the display panel DP rises, an amount of change in the current Ie increases between the sensing time points, which in turn causes damage to the display device DD.

Figure 9:
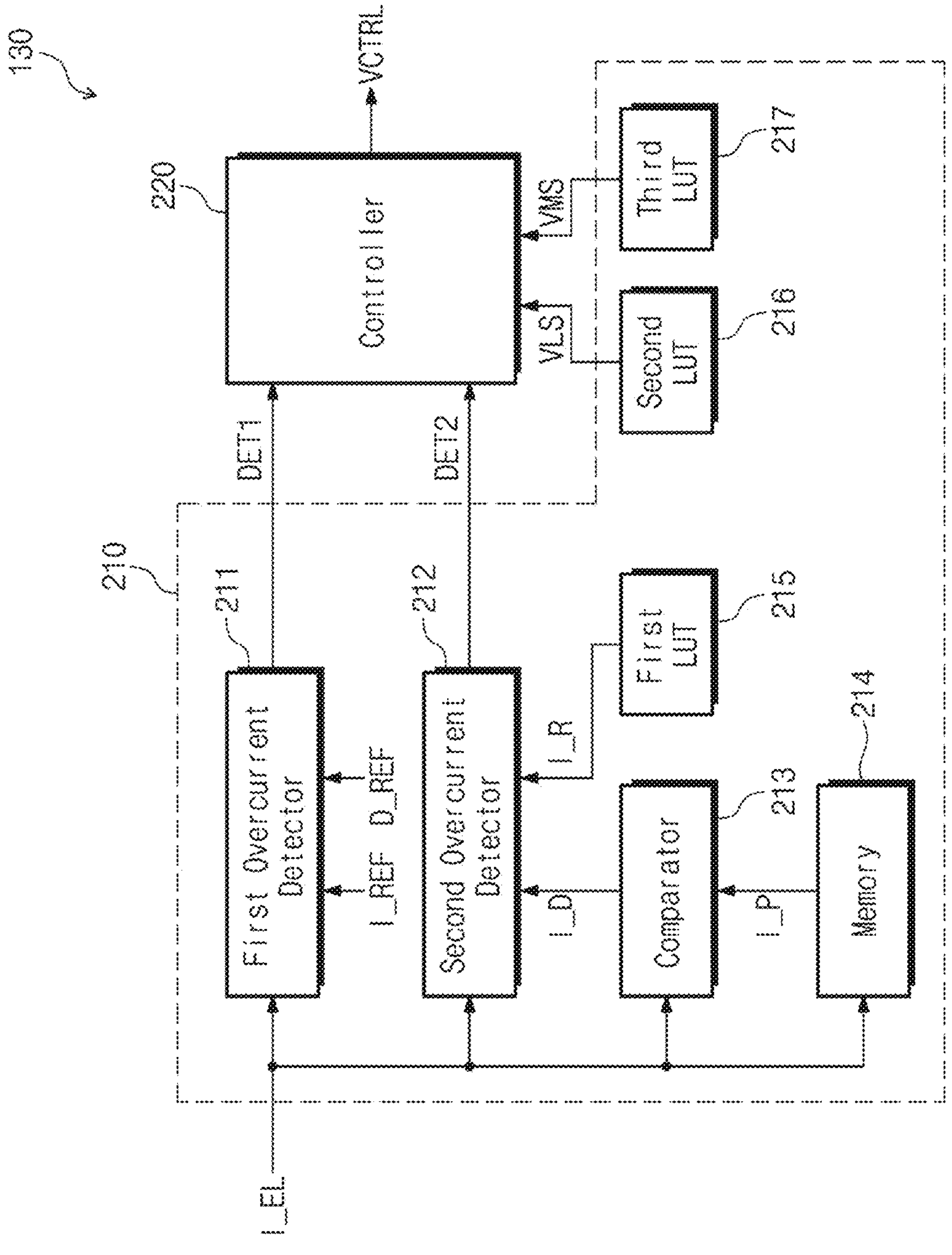
FIG. 9 is a block diagram illustrating an embodiment of a configuration of an overcurrent controller according to the inventive concept.

FIG. 9 is a block diagram illustrating an embodiment of a configuration of the overcurrent controller 130 according to the inventive concept.

Referring to FIG. 9, the overcurrent controller 130 includes an overcurrent detector 210 and a controller 220.

The overcurrent detector 210 compares a present current level of the current signal I_EL with the reference level I_REF, and outputs a first overcurrent detection signal DET1 of an active level when the present current level is higher than or equal to the reference level I_REF. In an embodiment, the overcurrent detector 210 calculates a difference value between a present current level and a previous current level of the current signal I_EL, and outputs a second overcurrent detection signal DET2 of the active level when the difference value is larger than a reference value D_REF. The large difference value between the present current level and the previous current level of the current signal I_EL means that an amount of change (or a rate of increase) of the current signal I_EL is large, and as a result, the current signal I_EL may reach the reference level I_REF within a short time. Accordingly, when the difference value between the present current level and the previous current level of the current signal I_EL is larger than the reference value D_REF, control is desired for reducing the amount of change in the current Ie.

When at least one of the first overcurrent detection signal DET1 or the second overcurrent detection signal DET2 is at the active level, the controller 220 outputs the voltage control signal VCTRL for changing the voltage level of the first driving voltage ELVDD.

The overcurrent detector 210 includes a first overcurrent detector 211, a second overcurrent detector 212, a comparator 213, a memory 214, a first lookup table 215, a second lookup table 216, and a third lookup table 217.

The first overcurrent detector 211 compares a present current level of the current signal I_EL with the reference level I_REF, and outputs the first overcurrent detection signal DET1 of the active level when the present current level is higher than or equal to the reference level I_REF.

Figure 10:
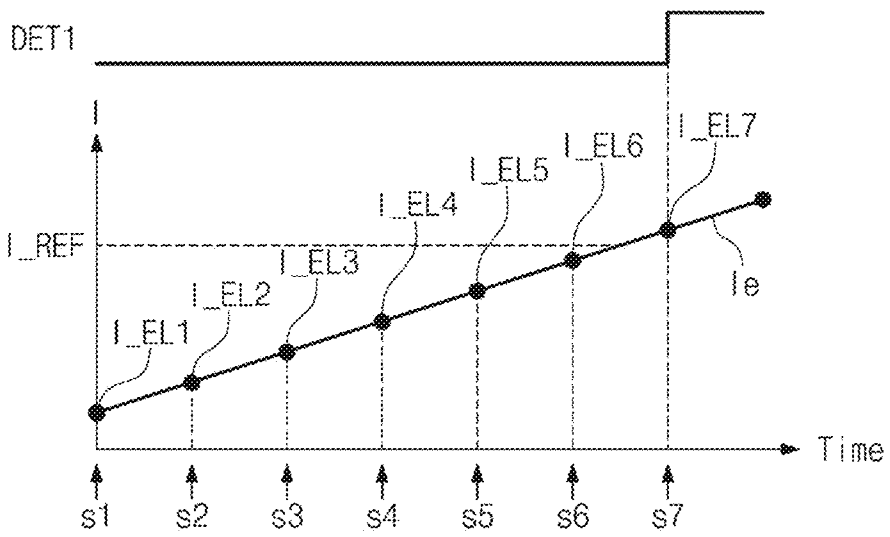
FIG. 10 is a graph for describing an operation of a first overcurrent detector.

FIG. 10 is a graph for describing an operation of the first overcurrent detector 211.

Referring to FIGS. 3, 9, and 10, the current sensor 20 senses the current Ie of the first voltage line VL1 at each of the sensing time points s1 to s7 and provides the current signal I_EL to the first overcurrent detector 211.

Each of current signals I_EL1 to I_EL7 shown in FIG. 10 is the current signal I_EL provided from the current sensor 20 to the first overcurrent detector 211 at a corresponding one of the sensing time points s1 to s7.

The first overcurrent detector 211 compares the current signal I_EL received at each of the sensing time points s1 to s7 with the reference level I_REF. Because levels of the current signals I_EL1 to I_EL6 at the sensing time points s1 to s6, respectively, are lower than the reference level I_REF in the embodiment shown in FIG. 10, the first overcurrent detector 211 outputs a first overcurrent detection signal DET1 of an inactive level at the sensing time points s1 to s6.

Because a level of the current signal I_EL7 is higher than the reference level I_REF at the sensing time point s7 in the embodiment shown in FIG. 10, the first overcurrent detector 211 may output the first overcurrent detection signal DET1 of the active level.

Referring back to FIG. 9, the memory 214 stores the current signal I_EL and provides a previous current signal I_P to the comparator 213.

The comparator 213 calculates a difference value between a present current level of the current signal I_EL and a previous current level of the previous current signal I_P and outputs a current difference signal I_D corresponding to the difference value.

When the current difference signal I_D corresponding to the difference value between the present current level and the previous current level of the current signal I_EL is greater than a reference value I_R, the second overcurrent detector 212 outputs the second overcurrent detection signal DET2 of the active level.

The first lookup table 215 stores the reference value I_R corresponding to the current level of the current signal I_EL.

Figure 11:
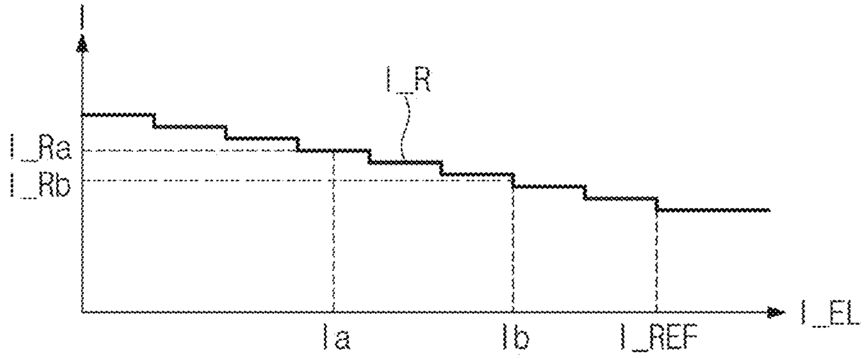
FIG. 11 is a graph showing reference values corresponding to current levels of a current signal defined in a first lookup table.

FIG. 11 is a graph showing currents corresponding to current levels of the current signal I_EL defined in the first lookup table 215.

Referring to FIGS. 9 and 11, the reference value I_R may be determined according to the current level of the current signal I_EL.

In an embodiment, when the current level of the current signal I_EL is Ia, the reference value I_R may be determined as a value corresponding to a current I_Ra, for example. When the current level of the current signal I_EL is Ib, the reference value I_R may be determined as a value corresponding to a current I_Rb. That is, as the current level of the current signal I_EL increases, the reference value I_R decreases.

As described with reference to FIG. 8, in the case that the amount of change in the current Ie between the sensing time points s4 and s5 is large when the temperature of the display panel DP is the second temperature, the current level of the current Ie may exceed the maximum current I_MAX before the overcurrent detector 210 detects an overcurrent.

In an embodiment, as the current level of the current signal I_EL increases, the reference value I_R decreases. Accordingly, as the current level of the current signal I_EL increases, the second overcurrent detector 212 may detect an overcurrent by precisely sensing the amount of change in the current Ie.

The second overcurrent detector 212 obtains the reference value I_R corresponding to the current level of the current signal I_EL from the first lookup table 215 to compare the current difference signal I_D with the reference value I_R, and may output the second overcurrent detection signal DET2 of the active level when the current difference signal I_D is greater than the reference value I_R.

Figure 12:
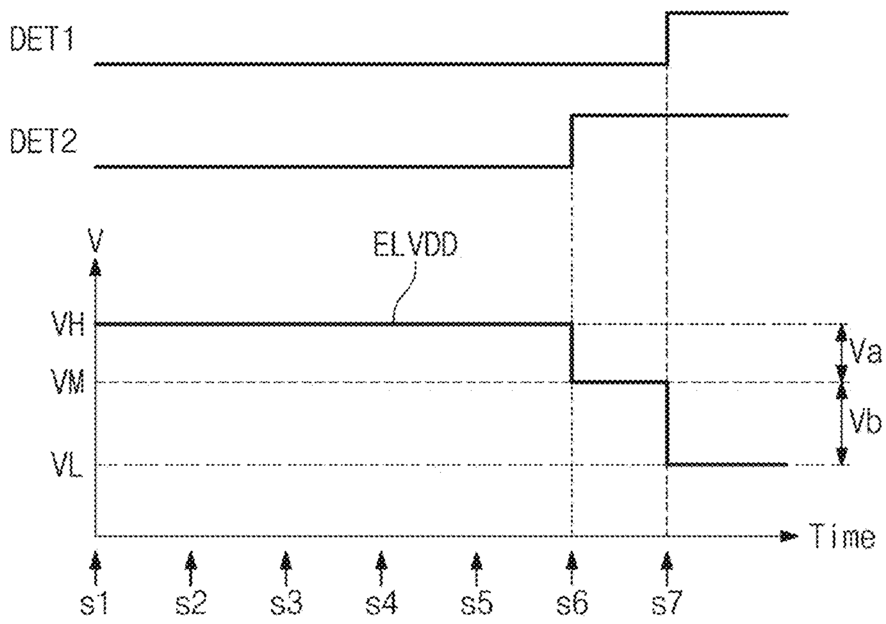
FIG. 12 is a graph showing a change in a voltage level of a first driving voltage by control of the overcurrent controller illustrated in FIG. 9.

FIG. 12 is a graph showing a change in a voltage level of the first driving voltage ELVDD by control of the overcurrent controller 130 illustrated in FIG. 9.

Referring to FIGS. 9 and 12, when both of the first overcurrent detection signal DET1 and the second overcurrent detection signal DET2 are at the inactive level (e.g., a low level) at each of the sensing time points s1 to s5, the controller 220 outputs a voltage control signal VCTRL that sets the voltage level of the first driving voltage ELVDD to a first voltage level VH.

The voltage generator 300 (refer to FIG. 3) generates the first driving voltage ELVDD of the first voltage level VH in response to the voltage control signal VCTRL.

When the current difference signal I_D is greater than the reference value I_R at the sensing time point s6, the second overcurrent detector 212 outputs the second overcurrent detection signal DET2 of the active level.

When the second overcurrent detection signal DET2 transitions to the active level, the controller 220 outputs a voltage control signal VCTRL for changing the voltage level of the first driving voltage ELVDD to an intermediate voltage level VM.

The voltage generator 300 (refer to FIG. 3) generates the first driving voltage ELVDD of the intermediate voltage level VM in response to the voltage control signal VCTRL. Here, the intermediate voltage level VM is lower than the first voltage level VH.

Because the level of the current signal I_EL7 is higher than the reference level I_REF at the sensing time point s7 in the embodiment shown in FIG. 10, the first overcurrent detector 211 outputs the first overcurrent detection signal DET1 of the active level.

When the first overcurrent detection signal DET1 transitions to the active level, the controller 220 outputs the voltage control signal VCTRL for changing the voltage level of the first driving voltage ELVDD.

The voltage generator 300 (refer to FIG. 3) generates a first driving voltage ELVDD of a second voltage level VL in response to the voltage control signal VCTRL. Here, the second voltage level VL is lower than the intermediate voltage level VM.

In addition, a difference Vb between the intermediate voltage level VM and the second voltage level VL is greater than a difference Va between the first voltage level VH and the intermediate voltage level VM (Vb>Va). Accordingly, when the first overcurrent detector 211 senses a current signal I_EL having a level higher than the reference level I_REF, the voltage level of the first driving voltage ELVDD may be further lowered to prevent the overcurrent from damaging the display device DD. However, the inventive concept is not limited thereto. In an embodiment, the difference Va between the first voltage level VH and the intermediate voltage level VM may be greater than or equal to the difference Vb between the intermediate voltage level VM and the second voltage level VL (Va≥Vb).

The second lookup table 216 illustrated in FIG. 9 stores a first voltage signal VLS for changing the voltage level of the first driving voltage ELVDD to the second voltage level VL when the first overcurrent detection signal DET1 transitions to the active level. In an embodiment, the second lookup table 216 may store a plurality of different voltage levels and may output one of the plurality of voltage levels, suitable for the characteristics of the display panel DP, as the first voltage signal VLS.

The third lookup table 217 illustrated in FIG. 9 stores an intermediate voltage signal VMS for changing the voltage level of the first driving voltage ELVDD to the intermediate voltage level VM when the second overcurrent detection signal DET2 transitions to the active level. In an embodiment, the third lookup table 217 may store a plurality of different voltage levels and may output one of the plurality of voltage levels, suitable for the characteristics of the display panel DP, as the intermediate voltage signal VMS.

Figure 13:
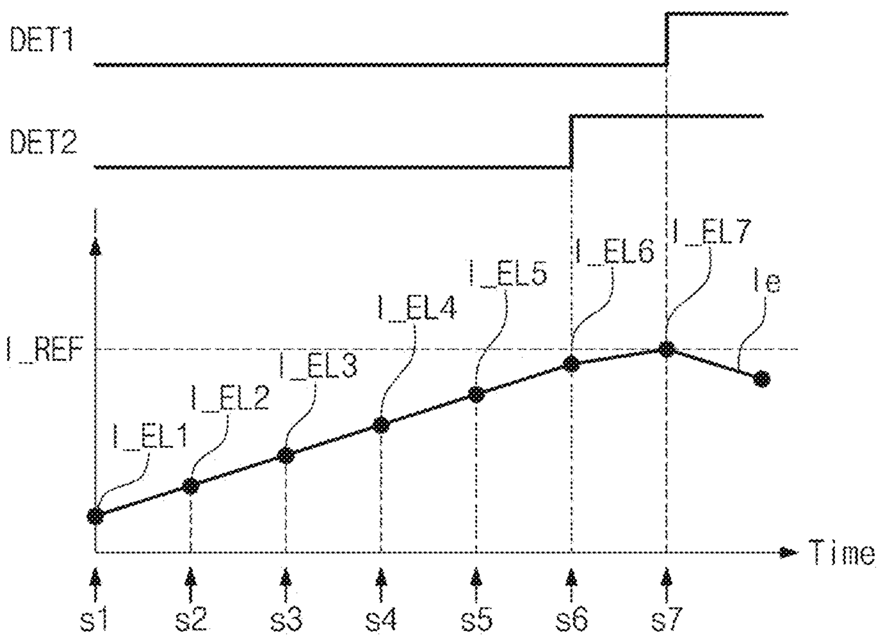
FIG. 13 is a graph showing a change in a current flowing through a first voltage line by control of the overcurrent controller illustrated in FIG. 9.

FIG. 13 is a graph showing a change in the current Ie flowing through the first voltage line VL1 by control of the overcurrent controller 130 illustrated in FIG. 9.

Referring to FIGS. 9, 12, and 13, both of the first overcurrent detection signal DET1 and the second overcurrent detection signal DET2 may be at the inactive level (e.g., the low level) at each of the sensing time points s1 to s5.

As the second overcurrent detection signal DET2 transitions to the active level at the sensing time point s6, the voltage level of the first driving voltage ELVDD is changed from the first voltage level VH to the intermediate voltage level VM. As a result, the amount of change in the current Ie flowing through the first voltage line VL1 may be reduced between the sensing time point s6 and the sensing time point s7.

Even when the amount of change in the current Ie is reduced, the first overcurrent detector 211 outputs, at the sensing time point s7, the first overcurrent detection signal DET1 of the active level when the current level of the current signal I_EL7 is higher than the reference level I_REF at the sensing time point s7. As a result, the current Ie flowing through the first voltage line VL1 may decrease after the sensing time point s7.

Figure 14:
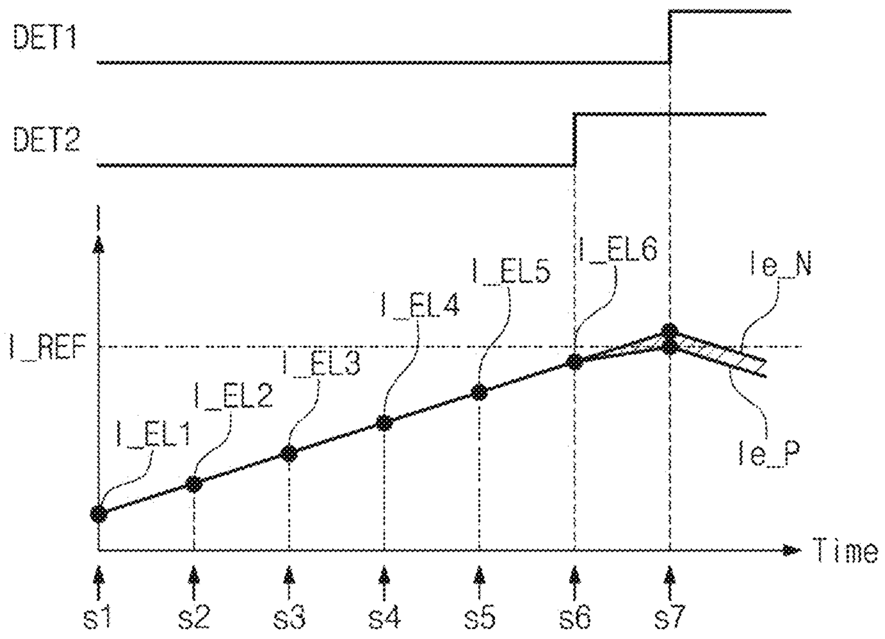
FIG. 14 is a graph showing a change in a current according to whether the second overcurrent detector illustrated in FIG. 9 is operating.

FIG. 14 is a graph showing a change in the current Ie according to whether the second overcurrent detector 212 illustrated in FIG. 9 is operating.

In FIG. 14, a current curve Ie_P represents a change in the current Ie when the second overcurrent detector 212 is operating, and a current curve Ie_N represents a change in the current Ie when the second overcurrent detector 212 is not operating.

Referring to FIGS. 3, 9, and 14, assuming that the second overcurrent detector 212 is not operating, the first overcurrent detector 211 outputs, at the sensing time point s6, the first overcurrent detection signal DET1 of the inactive level because the level of the current signal I_EL6 corresponding to the current Ie is lower than the reference level I_REF at the sensing time point s6. As a result, the current Ie may exceed the maximum current I_MAX at the sensing time point s7.

Because the level of the current signal I_EL corresponding to the current Ie_P is higher than the reference level I_REF at the sensing time point s7, the first overcurrent detector 211 outputs the first overcurrent detection signal DET1 of the active level.

When the second overcurrent detector 212 is operating, the second overcurrent detector 212 may output the second overcurrent detection signal DET2 of the active level according to a comparison result of the current difference signal I_D and the reference value I_R at the sensing time point s6. As a result, even when the current Ie increases at the sensing time point s7, the current Ie may be at a current level lower than the maximum current I_MAX.

Figure 15:
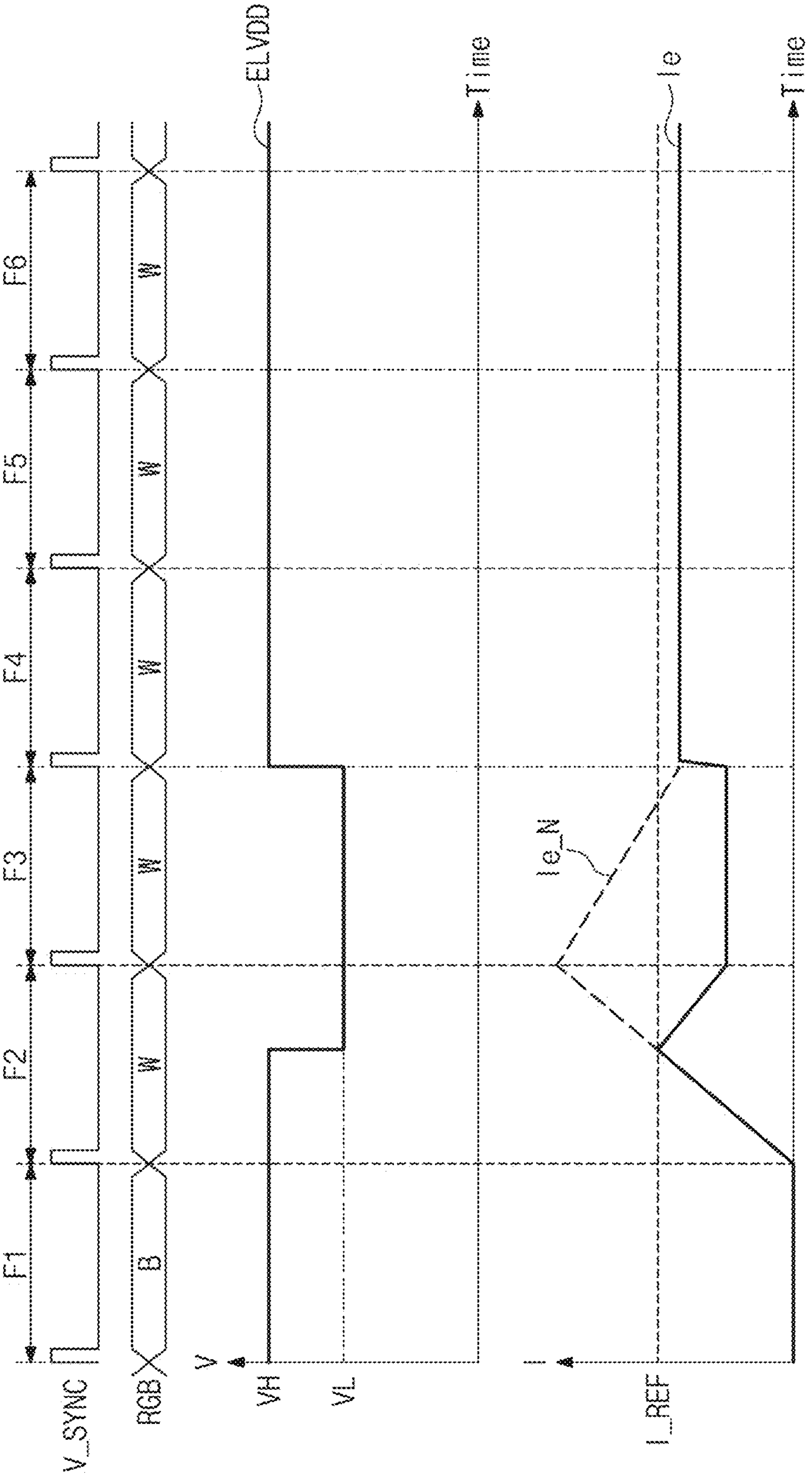
FIG. 15 is a graph showing a change in a voltage level of a first driving voltage at a first temperature.

FIG. 15 is a graph showing a change in a voltage level of a first driving voltage at a first temperature.

Figure 16:
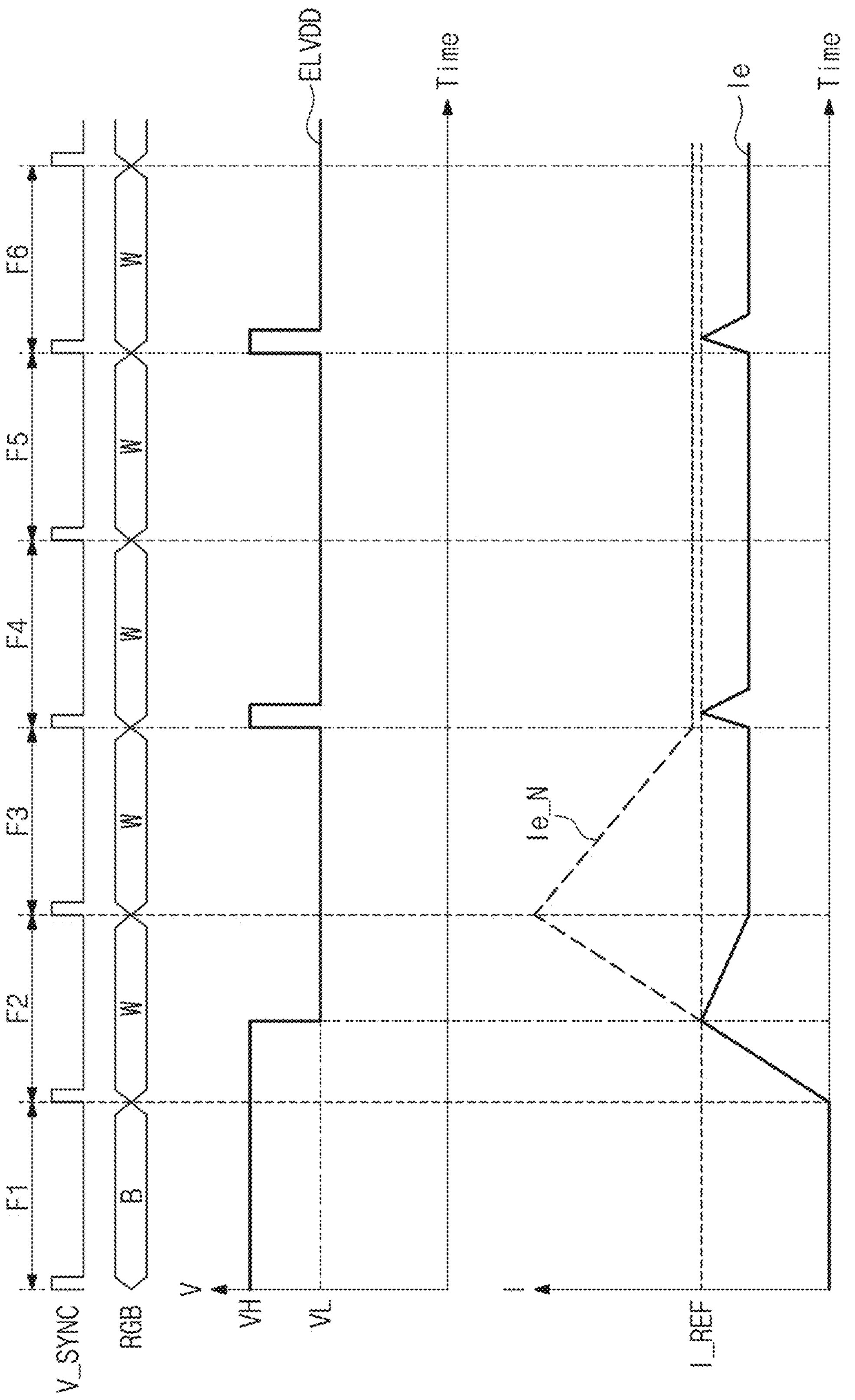
FIG. 16 is a graph showing a change in a voltage level of a first driving voltage at a second temperature.

FIG. 16 is a graph showing a change in a voltage level of a first driving voltage at a second temperature.

Referring to FIGS. 3, 15, and 16, a vertical synchronization signal V_SYNC may be a signal included in the control signal CTRL.

The driving controller 100 may receive the image signal RGB synchronized with the vertical synchronization signal V_SYNC.

A portion of the image signal RGB corresponding to a black grayscale B may be received in a first frame F1, and portions of the image signal RGB corresponding to a white grayscale W may be respectively received in second to sixth frames F2 to F6.

As described above with reference to FIG. 7, the image processor 110 may calculate a load of a portion of the image signal RGB of one frame and may output a corresponding portion of the image data signal DS obtained by adjusting a grayscale level according to the calculated load.

However, because it takes a time of one frame for the image processor 110 to calculate the load and adjust the grayscale level, the image processor 110 outputs, in the second frame F2, a corresponding portion of the image data signal DS having a grayscale level which is not adjusted, even when the portion of the image signal RGB of the white grayscale W is received in the second frame F2. Accordingly, the current level of the current Ie flowing through the first voltage line VL1 may gradually increase during the second frame F2.

When the current level of the current Ie flowing through the first voltage line VL1 is higher than or equal to the reference level I_REF in the second frame F2, the driving controller 100 may change the voltage level of the first driving voltage ELVDD from the first voltage level VH to the second voltage level VL. In an embodiment, the second voltage level VL is lower than the first voltage level VH.

In the case that the overcurrent controller 130 illustrated in FIG. 6 does not change the voltage level of the first driving voltage ELVDD, a level of the current Ie_N flowing through the first voltage line VL1 may increase greater than the reference level I_REF.

When the current level of the current Ie flowing through the first voltage line VL1 is higher than or equal to the reference level I_REF, the driving controller 100 changes the voltage level of the first driving voltage ELVDD from the first voltage level VH to the second voltage level VL. As the voltage level of the first driving voltage ELVDD is lowered to the second voltage level VL, the current level of the current Ie flowing through the first voltage line VL1 may also decrease.

The driving controller 100 restores the first driving voltage ELVDD to the first voltage level VH when the current level of the current Ie is lower than the reference level I_REF in the fourth frame F4.

As shown in FIG. 15, even when, in the fourth to sixth frames F4 to F6, the portions of the image signal RGB corresponding to the white grayscale W are received, and the first driving voltage ELVDD is maintained at the first voltage level VH, the current level of the current Ie flowing through the first voltage line VL1 may be stably adjusted when the temperature of the display panel DP is the first temperature.

As shown in FIG. 16, when the temperature of the display panel DP is the second temperature higher than the first temperature, the current level of the current Ie flowing through the first voltage line VL1 may increase again when the first driving voltage ELVDD is restored to the first voltage level VH in the fourth frame F4.

When the current level of the current Ie is higher than or equal to the reference level I_REF, the driving controller 100 changes the voltage level of the first driving voltage ELVDD from the first voltage level VH to the second voltage level VL. As the voltage level of the first driving voltage ELVDD is lowered to the second voltage level VL, the current level of the current Ie flowing through the first voltage line VL1 also decreases.

As described above, when the current Ie repeatedly decreases and increases, the amount of current supplied to the light-emitting element ED (refer to FIG. 4) changes, which may be perceived by a user as a flicker. Such a flicker phenomenon may occur frequently as the temperature of the display panel DP rises.

Figure 17:
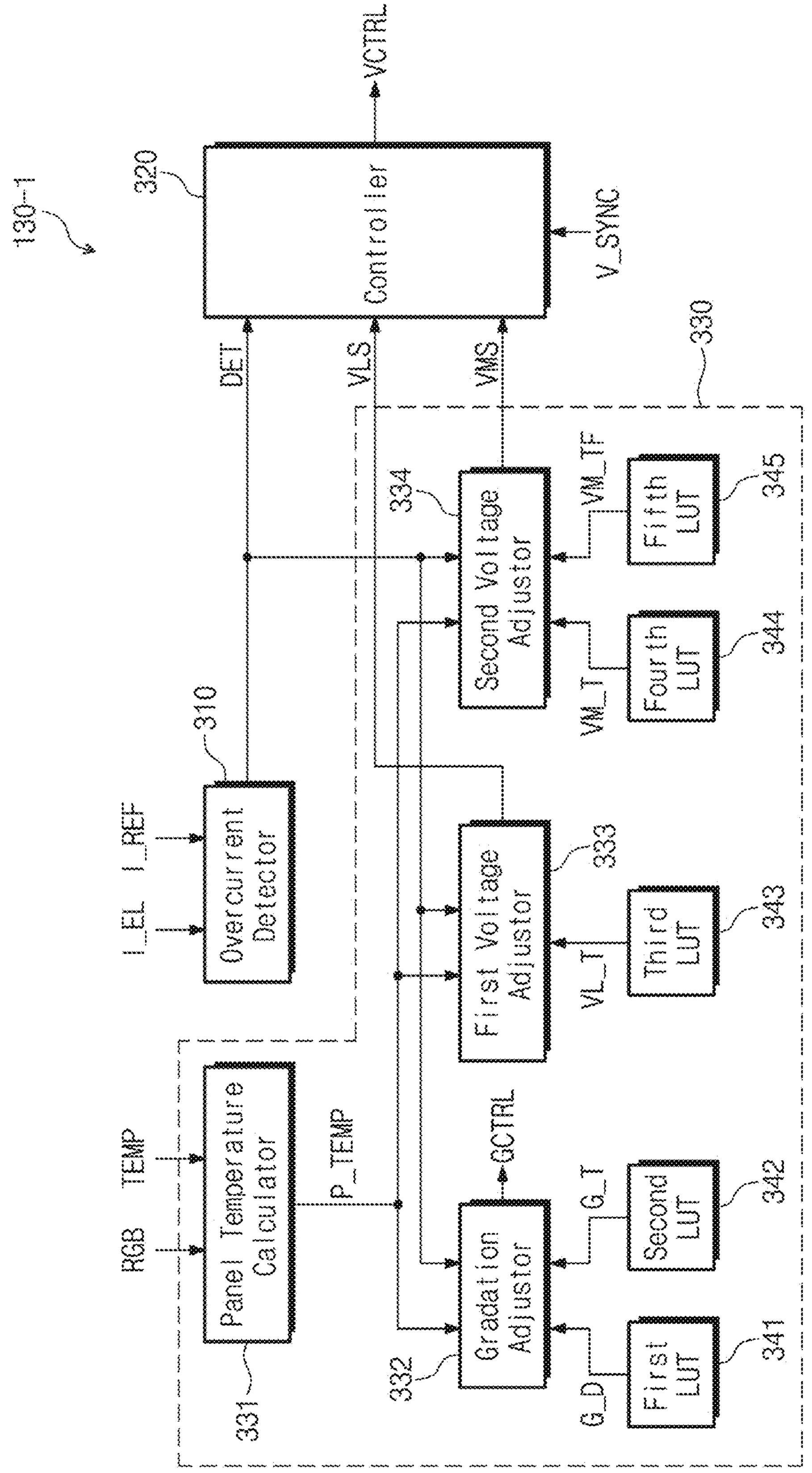
FIG. 17 is a block diagram illustrating an embodiment of a configuration of an overcurrent controller according to the inventive concept.

FIG. 17 is a block diagram illustrating an embodiment of a configuration of an overcurrent controller 130-1 according to the inventive concept.

Referring to FIG. 17, the overcurrent controller 130-1 changes the voltage level of the first driving voltage ELVDD to a second voltage level when the level of the current signal I_EL is greater than or equal to a reference value, and outputs a voltage control signal VCTRL so that the voltage level of the first driving voltage ELVDD gradually increases from the second voltage level to a first voltage level during a restoration period. The restoration period may be a period in which the voltage level of the first driving voltage ELVDD is restored from the second voltage level to the first voltage level.

The overcurrent controller 130-1 includes an overcurrent detector 310, a controller 320, and a voltage level adjuster 330.

The overcurrent detector 310 compares a present current level of the current signal I_EL with a reference level I_REF, and outputs an overcurrent detection signal DET of an active level when the present current level is higher than or equal to the reference level I_REF. In an embodiment, the overcurrent detector 310 calculates a difference value between a present current level and a previous current level of the current signal I_EL, outputs the overcurrent detection signal DET of the active level when the difference value is greater than a reference value.

In an embodiment, the overcurrent detector 310 may include the same circuit configuration as the overcurrent detector 210 illustrated in FIG. 9.

In an embodiment, the overcurrent detection signal DET outputted from the overcurrent detector 310 may correspond to any one of the first overcurrent detection signal DET1 and the second overcurrent detection signal DET2 outputted from the overcurrent detector 210 illustrated in FIG. 9.

The voltage level adjuster 330 outputs a first voltage signal VLS and an intermediate voltage signal VMS for setting the voltage level of the first driving voltage ELVDD in response to the image signal RGB, the temperature signal TEMP, and the overcurrent detection signal DET.

In an embodiment, the voltage level adjuster 330 may output a grayscale control signal GCTRL for adjusting the grayscale level of the image data signal DS in response to the image signal RGB, the temperature signal TEMP, and the overcurrent detection signal DET.

The controller 320 outputs the voltage control signal VCTRL for changing the voltage level of the first driving voltage ELVDD in response to the overcurrent detection signal DET, the first voltage signal VLS, and the intermediate voltage signal VMS. In an embodiment, the controller 320 may output the voltage control signal VCTRL in synchronization with the vertical synchronization signal V_SYNC. However, the inventive concept is not limited thereto. In an embodiment, the controller 320 may output the voltage control signal VCTRL in synchronization with another signal indicating one frame. In an embodiment, the controller 320 may output the voltage control signal VCTRL in synchronization with a vertical start signal included in the scan control signal SCS provided from a driving controller 100 to the scan driving circuit SD, for example.

The voltage level adjuster 330 includes a panel temperature calculator 331, a grayscale adjustor 332, a first voltage adjustor 333, a second voltage adjustor 334, and first to fifth lookup tables 341 to 345.

The panel temperature calculator 331 calculates the temperature of the display panel DP (refer to FIG. 3) based on the temperature signal TEMP and the image signal RGB. The temperature signal TEMP is an ambient temperature sensed by the temperature sensor 10. In an embodiment, when the temperature sensor 10 is disposed (e.g., mounted) on the main circuit board MCB, the temperature sensor 10 may sense a temperature of the main circuit board MCB. The temperature of the display panel DP may vary depending on the grayscale level of the image signal RGB as well as the ambient temperature (the temperature of the main circuit board MCB). The panel temperature calculator 331 predicts the temperature of the display panel DP based on the temperature signal TEMP and the image signal RGB and outputs a panel temperature signal P_TEMP corresponding to the predicted temperature.

In an embodiment, the panel temperature calculator 331 may include a lookup table for storing a compensation temperature corresponding to the sensed ambient temperature.

The temperature sensor 10 and the voltage generator 300 may be disposed adjacent to each other on the main circuit board MCB. Due to a heat generation phenomenon of the voltage generator 300 generating a high current, the temperature of a portion of the main circuit board MCB may be measured to be somewhat high. Accordingly, the panel temperature calculator 331 needs to calculate the panel temperature signal P_TEMP in consideration of the temperature of the entirety of the area of the main circuit board MCB. The panel temperature calculator 331 may obtain the compensation temperature corresponding to the sensed ambient temperature by referring to the lookup table and may output the panel temperature signal P_TEMP based on the compensation temperature and the grayscale level of the image signal RGB.

The grayscale adjustor 332 outputs the grayscale control signal GCTRL in response to the overcurrent detection signal DET and the panel temperature signal P_TEMP.

The first voltage adjustor 333 outputs the first voltage signal VLS in response to the overcurrent detection signal DET, the panel temperature signal P_TEMP, and a first voltage control signal VL_T from the third lookup table 343.

The second voltage adjustor 334 outputs the intermediate voltage signal VMS in response to the overcurrent detection signal DET, the panel temperature signal P_TEMP, a first intermediate voltage control signal VM_T from the fourth lookup table 344, and a second intermediate voltage control signal VM_TF from the fifth lookup table 345.

Operations of the first voltage adjustor 333 and the second voltage adjustor 334 will be described with reference to FIGS. 18 to 21.

Figure 18:
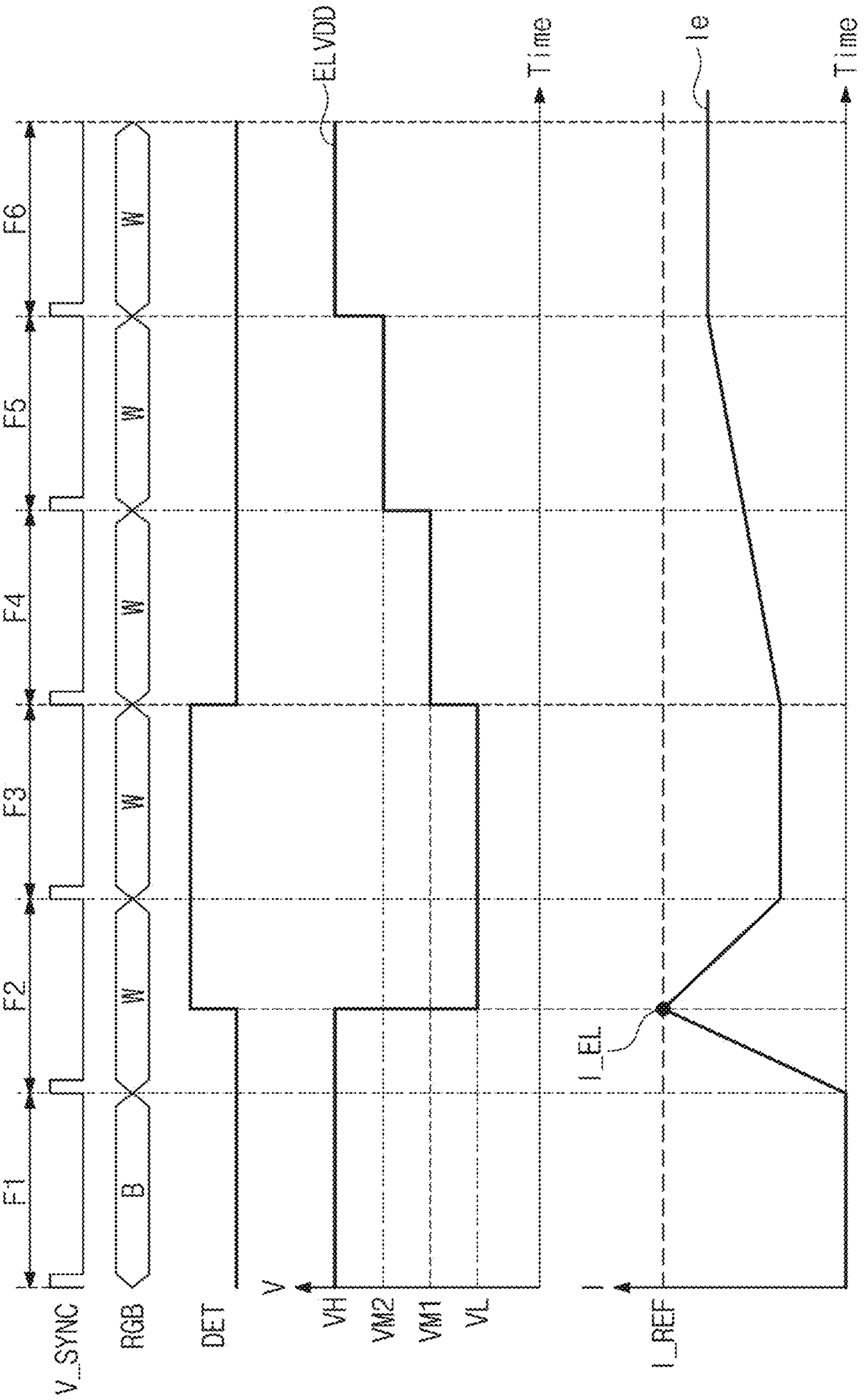
FIG. 18 is a graph showing a change in a voltage level of a first driving voltage.

FIG. 18 is a graph showing a change in a voltage level of a first driving voltage.

Figure 19:
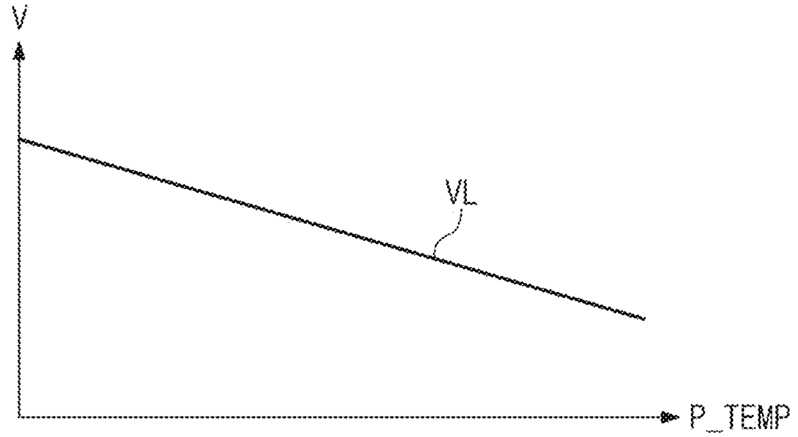
FIG. 19 is a graph showing a second voltage level according to a panel temperature signal.

FIG. 19 is a graph showing a second voltage level according to a panel temperature signal.

Figure 20:
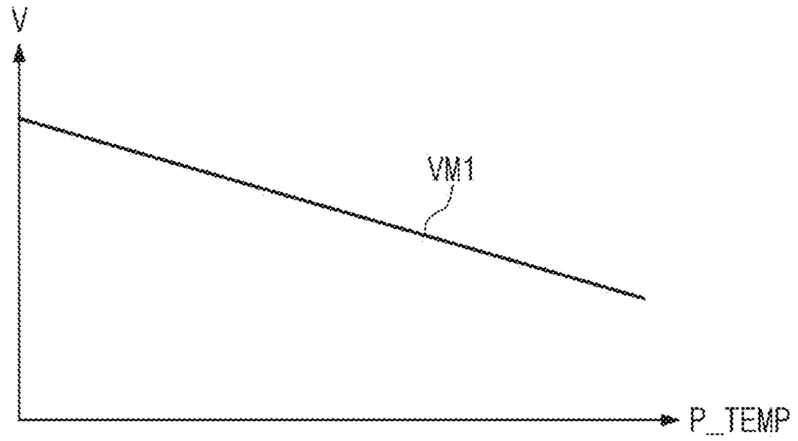
FIG. 20 is a graph showing a first intermediate voltage level according to a panel temperature signal.

FIG. 20 is a graph showing a first intermediate voltage level according to a panel temperature signal.

Figure 21:
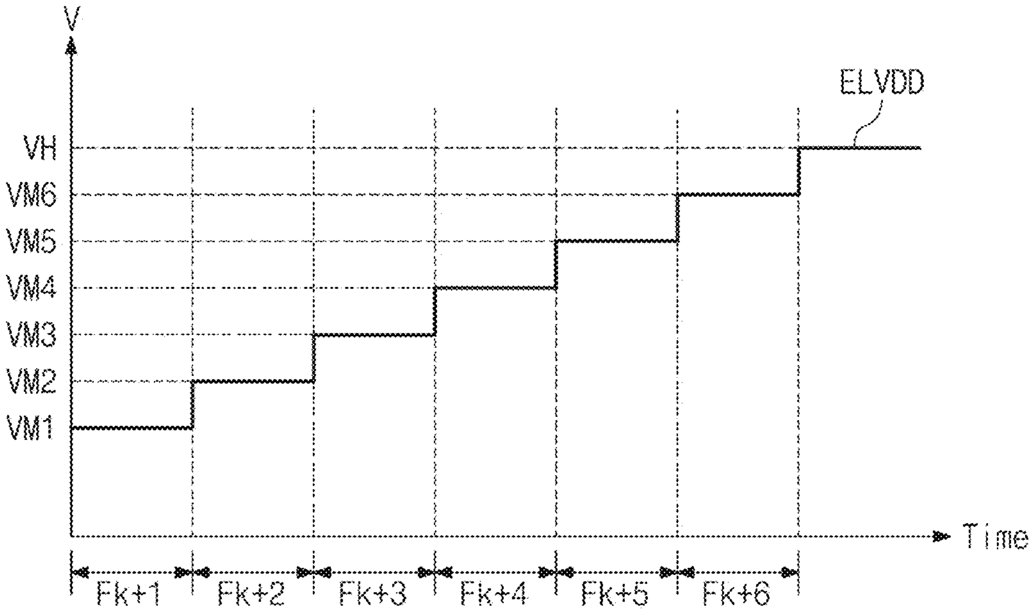
FIG. 21 is a graph showing a change in a voltage level of a first driving voltage during a restoration period.

FIG. 21 is a graph showing a change in a voltage level of a first driving voltage during a restoration period.

Referring to FIGS. 3, 17, and 18, the vertical synchronization signal V_SYNC may be a signal included in the control signal CTRL.

The driving controller 100 may receive the image signal RGB synchronized with the vertical synchronization signal V_SYNC.

A portion of the image signal RGB corresponding to the black grayscale B may be received in the first frame F1, and portions of the image signal RGB corresponding to the white grayscale W may be respectively received in the second to sixth frames F2 to F6.

As described above with reference to FIG. 7, the image processor 110 may calculate a load of a portion of the image signal RGB of one frame and may output a corresponding portion of the image data signal DS obtained by adjusting a grayscale level according to the calculated load.

However, because it takes a time of one frame for the image processor 110 to calculate the load and adjust the grayscale level, the image processor 110 outputs, in the second frame F2, a corresponding portion of the image data signal DS having a grayscale level which is not adjusted, even when the portion of the image signal RGB of the white grayscale W is received in the second frame F2. Accordingly, the current level of the current Ie flowing through the first voltage line VL1 may gradually increase during the second frame F2.

In the second frame F2, the overcurrent detector 310 outputs the overcurrent detection signal DET of the active level when the level of the current signal I_EL sensing the current level of the current Ie flowing through the first voltage line VL1 is higher than or equal to the reference level I_REF.

The first voltage adjustor 333 receives the first voltage control signal VL_T corresponding to the panel temperature signal P_TEMP from the third lookup table 343 when the overcurrent detection signal DET is at the active level. The first voltage adjustor 333 may output the first voltage signal VLS corresponding to the first voltage control signal VL_T.

The voltage level of the first voltage control signal VL_T stored in the third lookup table 343 is lowered as the temperature of the display panel rises. Accordingly, as shown in FIG. 19, a second voltage level VL is lowered as the temperature level of the panel temperature signal P_TEMP rises.

When the overcurrent detection signal DET is at the active level, the controller 320 outputs the voltage control signal VCTRL so that the voltage level of the first driving voltage ELVDD changes to the second voltage level VL in response to the first voltage signal VLS. Accordingly, the voltage level of the first driving voltage ELVDD outputted from the voltage generator 300 may be changed to the second voltage level VL.

As the voltage level of the first driving voltage ELVDD is lowered to the second voltage level VL, the current level of the current Ie flowing through the first voltage line VL1 may be lowered.

When the overcurrent detection signal DET transitions from the active level to an inactive level in the fourth frame F4, the second voltage adjustor 334 may output the intermediate voltage signal VMS corresponding to the first intermediate voltage control signal VM_T from the fourth lookup table 344.

The first intermediate voltage control signal VM_T corresponds to a first intermediate voltage level VM1 in the restoration period of the first driving voltage ELVDD.

The voltage level of the first intermediate voltage control signal VM_T stored in the fourth lookup table 344 is lowered as the temperature of the display panel rises. Accordingly, as shown in FIG. 20, the first intermediate voltage level VM1 is lowered as the temperature level of the panel temperature signal P_TEMP rises.

When the overcurrent detection signal DET is maintained at the inactive level in the fifth frame F5, the second voltage adjustor 334 may output the intermediate voltage signal VMS corresponding to the second intermediate voltage control signal VM_TF from the fifth lookup table 345.

The second intermediate voltage control signal VM_TF corresponds to a second intermediate voltage level VM2 of the first driving voltage ELVDD in the restoration period. The second intermediate voltage level VM2 is higher than the first intermediate voltage level VM1.

The voltage level of the second intermediate voltage control signal VM_TF stored in the fifth lookup table 345 increases step by step every frame. FIG. 21 shows a change in the first driving voltage ELVDD according to the second intermediate voltage control signal VM_TF stored in the fifth lookup table 345.

As shown in FIG. 21, the intermediate voltage level of the first driving voltage ELVDD may rise sequentially every frame in the restoration period. In an embodiment, the voltage level of the first driving voltage ELVDD may rise sequentially to the intermediate voltage levels VM1, VM2, VM3, VM4, VM5, and VM6 respectively from a first frame Fk+1 to a sixth frame Fk+6 of the restoration period, for example.

Each of the intermediate voltage levels VM1, VM2, VM3, VM4, VM5, and VM6 is higher than the second voltage level VL and lower than a first voltage level VH shown in FIG. 18. In addition, the number of intermediate voltage levels between the second voltage level VL and the first voltage level VH may be variously changed.

In addition, voltage differences between two adjacent intermediate voltage levels among the intermediate voltage levels VM1, VM2, VM3, VM4, VM5, and VM6 may be the same, but the inventive concept is not limited thereto. In an embodiment, a voltage difference between the intermediate voltage levels VM2 and VM3 may be greater than a voltage difference between the intermediate voltage levels VM1 and VM2, for example. Conversely, the voltage difference between the intermediate voltage levels VM1 and VM2 may be greater than the voltage difference between the intermediate voltage levels VM2 and VM3.

In FIGS. 17 and 18, the controller 320 may output the voltage control signal VCTRL so that the voltage level of the first driving voltage ELVDD changes to a voltage level corresponding to the intermediate voltage signal VMS after the overcurrent detection signal DET transitions from the active level to the inactive level, that is, in each of the fourth frame F4 and the fifth frame F5.

In FIGS. 17 and 18, the controller 320 may output the voltage control signal VCTRL so that the voltage level of the first driving voltage ELVDD changes to a voltage level corresponding to the first voltage level VH in the sixth frame F6.

The current level of the current Ie flowing through the first voltage line VL1 may increase gradually as the voltage level of the first driving voltage ELVDD rises gradually in the order of VM1, VM2, and VH in the second to sixth frames F2 to F6.

In the embodiment shown in FIG. 16, when the voltage level of the first driving voltage ELVDD changes from the second voltage level VL to the first voltage level VH in the restoration period, the current level of the current Ie flowing through the first voltage line VL1 may sharply rise.

As shown in FIG. 18, as the voltage level of the first driving voltage ELVDD rises to the first voltage level VH through the intermediate voltage levels VM1 and VM2, the current level of the current Ie flowing through the first voltage line VL1 may also increase gradually.

In FIG. 18, the fourth frame F4 and the fifth frame F5 may be the restoration period during which the voltage level of the first driving voltage ELVDD is restored from the second voltage level VL to the first voltage level VH.

The operation of the grayscale adjustor 332 will be described with reference to FIGS. 22 to 24.

Figure 22:
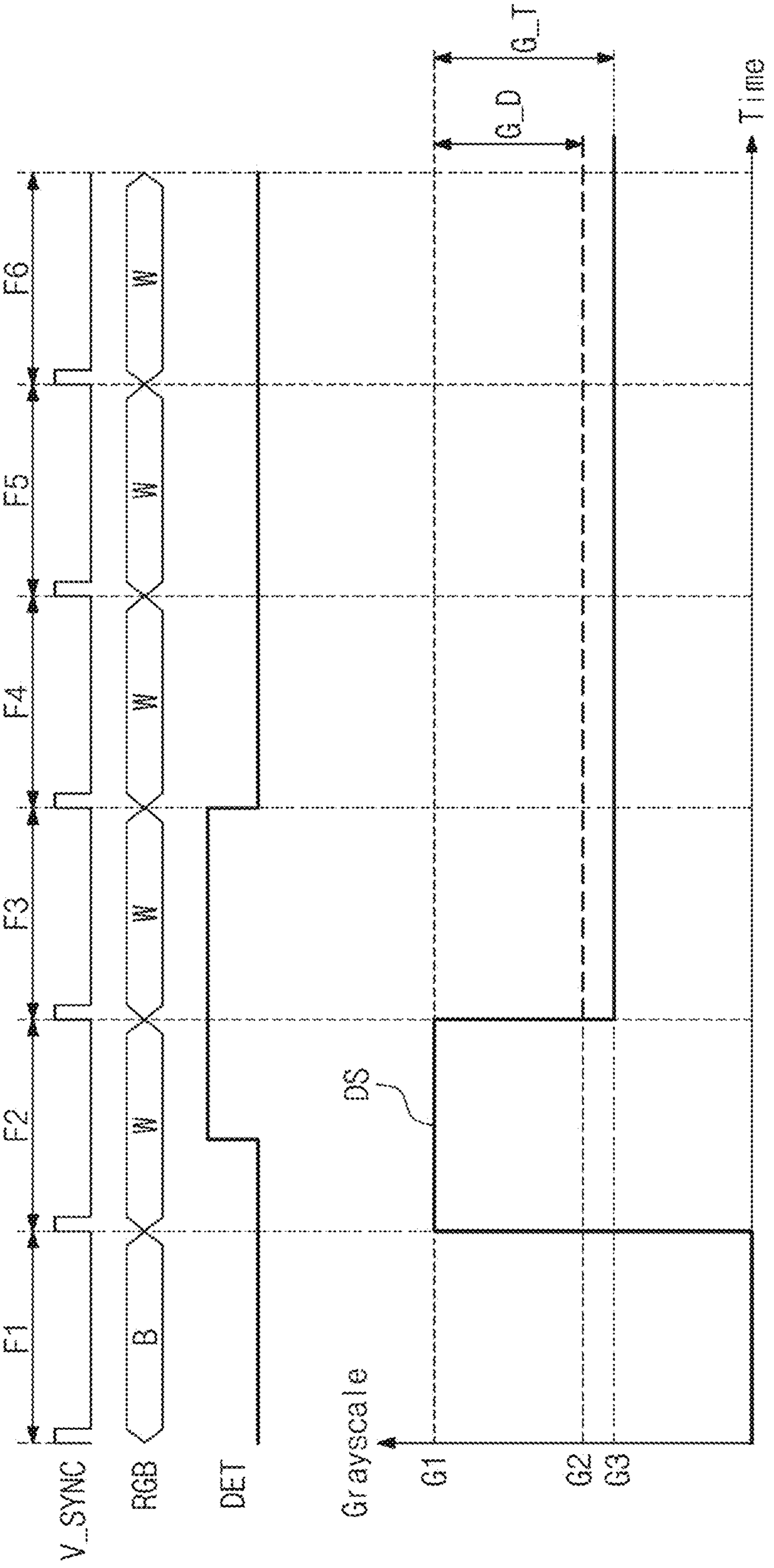
FIG. 22 is a graph showing a change in a grayscale level of an image data signal.

FIG. 22 is a graph showing a change in a grayscale level of an image data signal.

Figure 23:
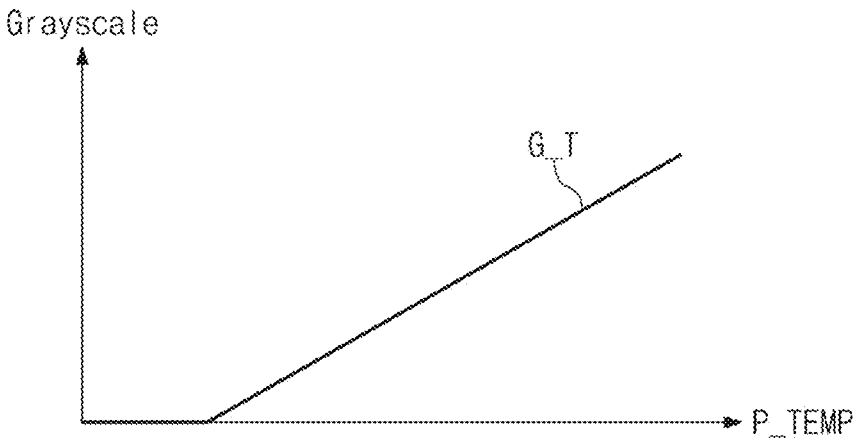
FIG. 23 is a graph showing a grayscale level of a grayscale-temperature correction signal according to a panel temperature signal.

FIG. 23 is a graph showing a correction grayscale level of a second correction signal G_T according to a panel temperature signal.

Figure 24:
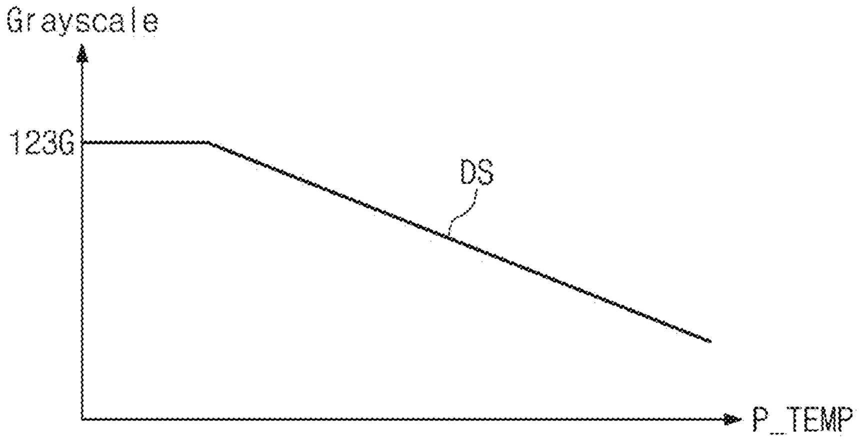
FIG. 24 is a graph showing a grayscale level of an image data signal according to a panel temperature signal.

FIG. 24 is a graph showing a change in a grayscale level of an image data signal according to a panel temperature signal.

Referring to FIGS. 17 and 22, the driving controller 100 may receive the image signal RGB synchronized with the vertical synchronization signal V_SYNC.

A portion of the image signal RGB corresponding to the black grayscale B may be received in the first frame F1, and portions of the image signal RGB corresponding to the white grayscale W may be respectively received in the second to sixth frames F2 to F6.

As described above with reference to FIG. 7, the image processor 110 may calculate a load of a portion of the image signal RGB of one frame and may output a corresponding portion of the image data signal DS obtained by adjusting a grayscale level according to the calculated load.

However, because it takes a time of one frame for the image processor 110 to calculate the load and adjust the grayscale level, the image processor 110 outputs, in the second frame F2, a corresponding portion of the image data signal DS having a grayscale level which is not adjusted, even when the portion of the image signal RGB of the white grayscale W is received in the second frame F2.

When the overcurrent detection signal DET transitions to the active level, the grayscale adjustor 332 outputs the grayscale control signal GCTRL in response to the panel temperature signal P_TEMP, a first correction signal G_D from the first lookup table 341, and the second correction signal G_T from the second lookup table 342.

In the case that the temperature level of the panel temperature signal P_TEMP is lower than the first temperature when the overcurrent detection signal DET transitions to the active level, the grayscale adjustor 332 may output the first correction signal G_D from the first lookup table 341 as the grayscale control signal GCTRL.

The image processor 110 illustrated in FIGS. 6 and 7 may output a portion of the image data signal DS obtained by adjusting the grayscale level of a corresponding portion of the image signal RGB in response to the grayscale control signal GCTRL.

The image processor 110 may output a portion of the data signal DS of a first grayscale level G1 corresponding to the white grayscale W in the second frame F2 and may output a portion of the data signal DS of a second grayscale level G2 corresponding to the white grayscale W in the third frame F3. In this case, a difference between the first grayscale level G1 and the second grayscale level G2 may correspond to the first correction signal G_D from the first lookup table 341.

In the case that the temperature level of the panel temperature signal P_TEMP is higher than or equal to the first temperature when the overcurrent detection signal DET transitions to the active level, the grayscale adjustor 332 may output the second correction signal G_T from the second lookup table 342 as the grayscale control signal GCTRL.

The image processor 110 illustrated in FIG. 3 may output a portion of the image data signal DS after correcting the grayscale level of a corresponding portion of the image signal RGB in response to the grayscale control signal GCTRL.

The image processor 110 may output the portion of the data signal DS of the first grayscale level G1 corresponding to the white grayscale W in the second frame F2 and may output a portion of the data signal DS of a third grayscale level G3 corresponding to the white grayscale W in the third frame F3. In this case, a difference between the first grayscale level G1 and the third grayscale level G3 may correspond to the second correction signal G_T from the second lookup table 342. The third grayscale level G3 is lower than the second grayscale level G2.

As shown in FIG. 23, the grayscale level of the second correction signal G_T stored in the second lookup table 342 rises as the temperature level of the panel temperature signal P_TEMP rises. That is, the correction grayscale level of the second correction signal G_T rises as the temperature of the display panel rises, so that the third grayscale level G3 shown in FIG. 22 is lowered.

As shown in FIG. 24, the grayscale level of the image data signal DS is lowered as the temperature level of the panel temperature signal P_TEMP rises.

By further lowering the grayscale level of the image data signal DS in a high temperature environment, an increase of the current Ie flowing through the first voltage line VL1 may be minimized in the high temperature environment.

Figure 25:
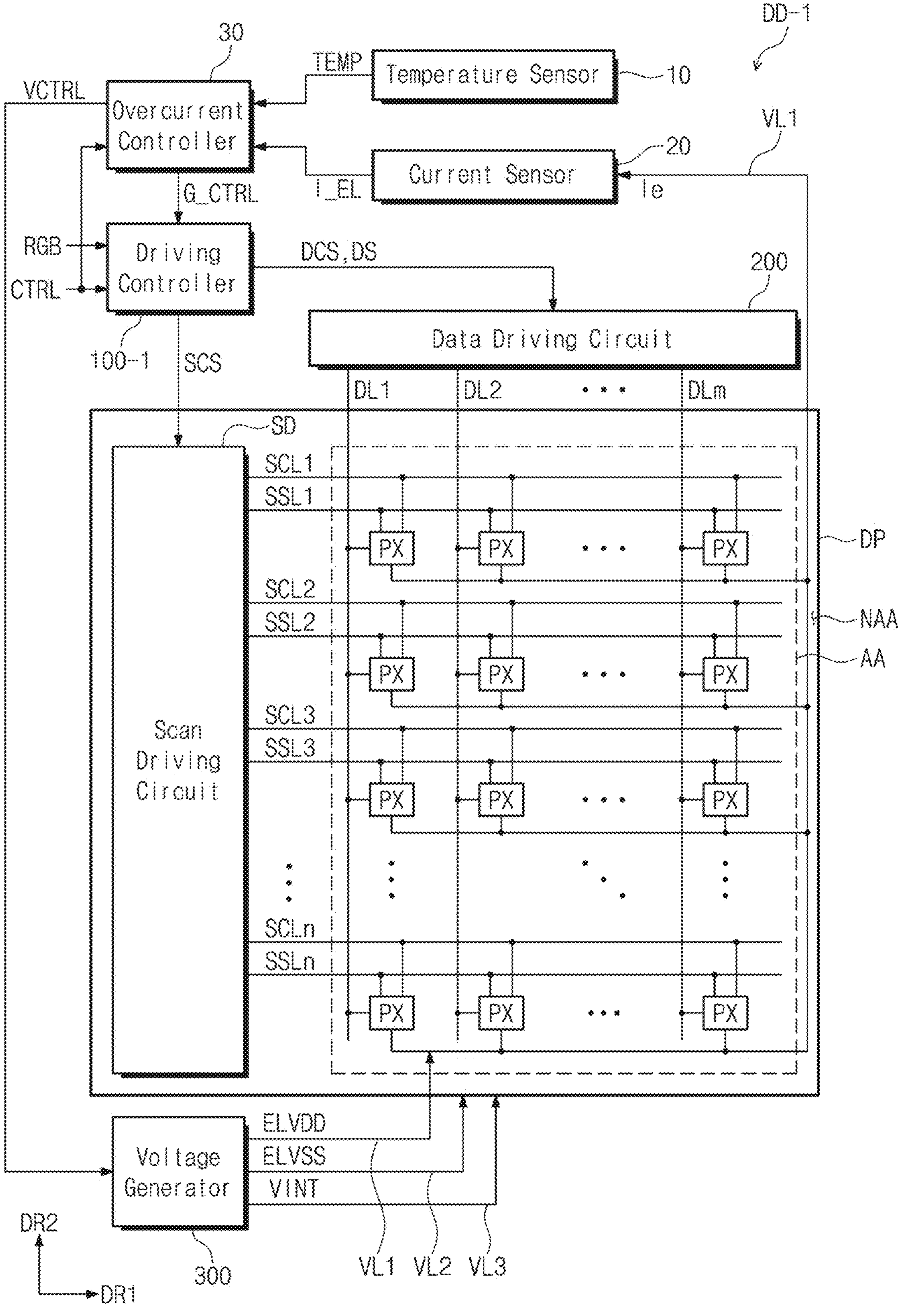
FIG. 25 is a block diagram of an embodiment of a display device according to the inventive concept.

FIG. 25 is a block diagram of an embodiment of a display device according to the inventive concept.

A display device DD-1 illustrated in FIG. 25 includes a temperature sensor 10, a current sensor 20, an overcurrent controller 30, a driving controller 100-1, a data driving circuit 200, a voltage generator 300, and a display panel DP.

In the display device DD-1 illustrated in FIG. 25, components the same as the components of the display device DD illustrated in FIG. 3 are denoted by the same reference numerals, and duplicate descriptions thereof will not be given.

The driving controller 100 of the display device DD illustrated in FIG. 3 includes the overcurrent controller 130 as illustrated in FIG. 6. In the display device DD-1 illustrated in FIG. 25, the overcurrent controller 30 is disposed outside the driving controller 100-1.

The overcurrent controller 30 outputs a grayscale control signal G_CTRL and a voltage control signal VCTRL in response to a control signal CTRL, a temperature signal TEMP, and a current signal I_EL. The grayscale control signal G_CTRL from the overcurrent controller 30 may be provided to the driving controller 100-1, and the voltage control signal VCTRL may be provided to the voltage generator 300.

The temperature sensor 10, the current sensor 20, and the overcurrent controller 30 may be disposed on the main circuit board MCB illustrated in FIG. 2, together with the driving controller 100-1.

In an embodiment, the overcurrent controller 30 may include the same circuit configuration as the overcurrent controller 130 illustrated in FIG. 9.

In an embodiment, the overcurrent controller 30 may include the same circuit configuration as the overcurrent controller 130-1 illustrated in FIG. 17.

The display device having such a configuration changes the voltage level of the first driving voltage when the current of the voltage line to which the first driving voltage is supplied has a current level higher than or equal to the reference level. In addition, by changing the voltage level of the first driving voltage according to the temperature of the display panel, it is possible to minimize the change, according to the temperature of the display panel, in the driving current supplied to the light-emitting element. Accordingly, deterioration of display quality of the display device may be prevented.

Although the embodiments of the inventive concept have been described herein, it is understood that various changes and modifications may be made by those skilled in the art within the spirit and scope of the inventive concept defined by the following claims or the equivalents.

Therefore, the embodiments described herein are not intended to limit the technical spirit and scope of the invention, and all technical spirit within the scope of the following claims or the equivalents will be construed as being included in the scope of the invention.

What is claimed is:

1. A display device comprising:

a display panel including a pixel which receives a driving voltage applied to a first voltage line;

a voltage generator which provides the driving voltage having a first voltage level to the first voltage line and determine a voltage level of the driving voltage based on a voltage control signal;

a current sensor which senses a current level of the first voltage line and outputs a current signal corresponding to the current level sensed by the current sensor; and an overcurrent controller which outputs the voltage control signal which changes the voltage level of the driving voltage when a difference value between a present current level and a previous current level of the current signal is greater than or equal to a reference value, wherein the voltage level of the driving voltage is changed to a second voltage level lower than the first voltage level when the difference value is greater than or equal to the reference value, wherein the pixel comprises:

a light-emitting element; and a transistor which is connected between the first voltage line and the light-emitting element and includes a gate electrode controlled by a data signal, wherein the voltage generator, the pixel and the current sensor are electrically connected through the first voltage line, and wherein the overcurrent controller outputs a first overcurrent detection signal of an active level when the present current level of the current signal is higher than or equal to a reference level, outputs a second overcurrent detection signal of the active level when the difference value between the present current level and the previous current level of the current signal is greater than or equal to the reference value, and outputs the voltage control signal which changes the voltage level of the driving voltage when at least one of the first overcurrent detection signal and the second overcurrent detection signal is at the active level.

2. The display device of claim 1, wherein the overcurrent controller outputs the voltage control signal which changes the voltage level of the driving voltage when the present current level of the current signal is higher than or equal to a reference level.

3. The display device of claim 1, wherein the overcurrent controller comprises:

a first overcurrent detector which outputs the first overcurrent detection signal of the active level when the present current level of the current signal is higher than or equal to the reference level;

a second overcurrent detector which outputs the second overcurrent detection signal of the active level when the difference value between the present current level and the previous current level of the current signal is greater than or equal to the reference value; and a controller which outputs the voltage control signal which changes the voltage level of the driving voltage when at least one of the first overcurrent detection signal and the second overcurrent detection signal is at the active level.

4. The display device of claim 3, wherein the overcurrent controller further comprises a first lookup table which stores the reference value corresponding to the present current level of the current signal.

5. The display device of claim 4, wherein the reference value decreases when the present current level of the current signal increases.

6. The display device of claim 3, wherein the overcurrent controller further comprises:

a memory which stores the current signal and outputs a previous current signal; and a comparator which calculates a difference value between the present current level of the current signal and a previous current level of the previous current signal from the memory and outputs the difference value between the present current level of the current signal and the previous current level of the previous current signal.

7. The display device of claim 3, wherein the overcurrent controller further comprises:

a second lookup table which stores a first voltage signal which changes the voltage level of the driving voltage to the second voltage level when the first overcurrent detection signal is at the active level; and a third lookup table which stores an intermediate voltage signal which changes the voltage level of the driving voltage to an intermediate voltage level when the second overcurrent detection signal is at the active level.

8. The display device of claim 7, wherein the controller outputs the voltage control signal which changes the voltage level of the driving voltage in response to the first overcurrent detection signal, the second overcurrent detection signal, the first voltage signal, and the intermediate voltage signal.

9. The display device of claim 8, wherein the controller outputs the voltage control signal which changes the voltage level of the driving voltage to the second voltage level corresponding to the first voltage signal when the first overcurrent detection signal is at the active level, and the controller outputs the voltage control signal which changes the voltage level of the driving voltage to the intermediate voltage level corresponding to the intermediate voltage signal when the second overcurrent detection signal is at the active level.

10. The display device of claim 9, wherein the controller outputs the voltage control signal which sets the driving voltage to the first voltage level higher than the second voltage level when both of the first overcurrent detection signal and the second overcurrent detection signal are at an inactive level, and the intermediate voltage level is higher than the second voltage level and lower than the first voltage level.

11. The display device of claim 10, wherein a difference between the intermediate voltage level and the second voltage level is greater than a difference between the first voltage level and the intermediate voltage level.

12. The display device of claim 2, further comprising a temperature sensor which senses an ambient temperature and outputs a temperature signal corresponding to the ambient temperature sensed by the temperature sensor.

13. The display device of claim 12, wherein the overcurrent controller comprises:

an overcurrent detector which outputs an overcurrent detection signal of an active level when the present current level of the current signal is higher than or equal to the reference level;

a voltage level adjuster which outputs a first voltage signal and an intermediate voltage signal in response to the overcurrent detection signal and the temperature signal; and a controller which outputs the voltage control signal which changes the voltage level of the driving voltage in response to the overcurrent detection signal, the first voltage signal, and the intermediate voltage signal.

14. The display device of claim 13, wherein the voltage level adjuster comprises a panel temperature calculator which calculates a temperature of the display panel based on an image signal and the temperature signal and outputs a panel temperature signal.

15. The display device of claim 14, wherein the voltage level adjuster determines a voltage level of the first voltage signal based on the panel temperature signal when the overcurrent detection signal transitions from an inactive level to the active level, and the voltage level adjuster determines a voltage level of the intermediate voltage signal based on the panel temperature signal when the overcurrent detection signal transitions from the active level to the inactive level.

16. A display device comprising:

a display panel including a pixel which receives a driving voltage applied to a first voltage line;

a voltage generator which provides the driving voltage having a first voltage level to the first voltage line and determines a voltage level of the driving voltage based on a voltage control signal;

a current sensor which senses a current level of the first voltage line and outputs a current signal corresponding to the current level sensed by the current sensor;

a temperature sensor which senses an ambient temperature and outputs a temperature signal corresponding to the ambient temperature sensed by the temperature sensor; and an overcurrent controller which outputs the voltage control signal based on the current signal and the temperature signal, wherein the voltage level of the driving voltage is changed to a second voltage level lower than the first voltage level when the current signal has a current level higher than or equal to a reference level, and the voltage level of the driving voltage gradually rises from the second voltage level to the first voltage level during a restoration period in which the driving voltage is restored from the second voltage level to the first voltage level, the second voltage level is determined based on the temperature signal, and the pixel comprises:

a light-emitting element; and a transistor which is connected between the first voltage line and the light-emitting element and includes a gate electrode controlled by a data signal, wherein the voltage generator, the pixel and the current sensor are electrically connected through the first voltage line, wherein the overcurrent controller calculates a temperature of the display panel based on the temperature signal and an image signal and outputs a panel temperature signal corresponding to the temperature, and outputs a first voltage control signal, wherein a voltage level of the first voltage control signal is lowered as a temperature level of the panel temperature signal rises, wherein the overcurrent controller outputs the voltage control signal based on the current signal and the first voltage control signal, and wherein the overcurrent controller comprises:

a lookup table which stores the first voltage control signal corresponding to the panel temperature signal; and a first voltage adjustor which outputs a first voltage signal based on the panel temperature signal and the first voltage control signal of the lookup table when the overcurrent detection signal transitions from an inactive level to an active level.

17. The display device of claim 16, wherein the overcurrent controller further comprises:

an overcurrent detector which compares the current signal with the reference level and outputs an overcurrent detection signal;

a voltage level adjuster which outputs the first voltage signal corresponding to the second voltage level and an intermediate voltage signal corresponding to an intermediate voltage level based on the overcurrent detection signal and the temperature signal; and a controller which outputs the voltage control signal in response to the overcurrent detection signal, the first voltage signal, and the intermediate voltage signal.

18. The display device of claim 17, wherein the voltage level adjuster comprises a panel temperature calculator which outputs the panel temperature signal corresponding to the temperature.

19. The display device of claim 18, wherein the voltage level adjuster further comprises:

a first lookup table which stores a first intermediate voltage control signal corresponding to the panel temperature signal;

a second lookup table which stores a second intermediate voltage control signal corresponding to the panel temperature signal; and a second voltage adjustor which outputs the intermediate voltage signal based on the overcurrent detection signal, the temperature signal, the first intermediate voltage control signal, and the second intermediate voltage control signal.

20. The display device of claim 19, wherein a voltage level of the first intermediate voltage control signal is lowered as a temperature level of the panel temperature signal rises.

21. The display device of claim 19, wherein the second lookup table comprises a plurality of voltage control signals and sequentially provides the plurality of voltage control signals as the second intermediate voltage control signal.

22. The display device of claim 16, wherein, after the overcurrent detection signal transitions from the active level to the inactive level, the voltage level of the driving voltage corresponds to a first intermediate voltage control signal in a first frame and corresponds to a second intermediate voltage control signal in a second frame.

23. The display device of claim 18, further comprising an image processor which receives the image signal and a grayscale control signal and convert the image signal into an image data signal in response to the grayscale control signal.

24. The display device of claim 23, wherein the voltage level adjuster further comprises:

a first lookup table which stores a first correction signal;

a second lookup table which stores a second correction signal corresponding to the panel temperature signal; and a grayscale adjustor which outputs one of the first correction signal and the second correction signal as the grayscale control signal based on the panel temperature signal when the overcurrent detection signal transitions from an inactive level to an active level.

25. The display device of claim 24, wherein, when the overcurrent detection signal is at the active level, the grayscale adjustor outputs the first correction signal as the grayscale control signal when a temperature level of the panel temperature signal is lower than a first temperature, and outputs the second correction signal as the grayscale control signal when the temperature level of the panel temperature signal is higher than or equal to the first temperature.

* * * * *